(12) United States Patent
Ohira et al.

(10) Patent No.: US 8,000,612 B2
(45) Date of Patent: Aug. 16, 2011

(54) OPTICAL TRANSMISSION DEVICE

(75) Inventors: Tomoaki Ohira, Osaka (JP); Kouichi Masuda, Osaka (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 11/794,158

(22) PCT Filed: Dec. 26, 2005

(86) PCT No.: PCT/JP2005/023717
§ 371 (c)(1),
(2), (4) Date: Jun. 26, 2007

(87) PCT Pub. No.: WO2006/080168
PCT Pub. Date: Aug. 3, 2006

(65) Prior Publication Data
US 2008/0075470 A1    Mar. 27, 2008

(30) Foreign Application Priority Data
Jan. 25, 2005   (JP) ................ 2005-016594

(51) Int. Cl.
*H04B 10/04* (2006.01)
*H04B 10/12* (2006.01)
(52) U.S. Cl. ......... 398/188; 398/182; 398/183; 398/198
(58) Field of Classification Search .................. 398/188, 398/182, 183, 195–198
See application file for complete search history.

(56) References Cited

U.S. PATENT DOCUMENTS

| 5,170,274 A | 12/1992 | Kuwata et al. | |
| RE36,088 E | 2/1999 | Kuwata et al. | |
| 7,561,810 B2 * | 7/2009 | Noguchi et al. | 398/198 |
| 2001/0005437 A1 | 6/2001 | Masuda et al. | |

(Continued)

FOREIGN PATENT DOCUMENTS

| JP | 6-67128 | 3/1994 |
| JP | 2642499 | 5/1997 |
| JP | 2001-133824 | 5/2001 |
| JP | 2001-244896 | 9/2001 |
| JP | 2002-221698 | 8/2002 |

(Continued)

OTHER PUBLICATIONS

English Translation of JP-2004-318052.*

*Primary Examiner* — Shi K Li
*Assistant Examiner* — Oommen Jacob
(74) *Attorney, Agent, or Firm* — Wenderoth, Lind & Ponack, L.L.P.

(57) ABSTRACT

An optical transmission device is provided with an external optical modulator including three or more Mach-Zehnder interferometers and outputs a single-sideband optical intensity-modulated signal with suppressed optical carrier component, wherein an optical carrier component and an unnecessary one sideband component contained in the outputted optical signal are suppressed. A light branching section (51) branches an optical signal outputted by an external optical modulator (4) into two signals. A photodetector section (52) converts one of the optical signals to an electric signal. An optical carrier component extracting section (54) extracts an optical carrier component signal that is in the vicinity of a frequency $f_1$ from the electric signal. An optical carrier component suppressing section (56) applies a bias voltage for suppressing the optical carrier component to the external optical modulator (4) based on the signal level of the optical carrier component. A vestigial sideband component extracting section (57) extracts a vestigial sideband component signal in the vicinity of a frequency $2 \times f_1$ from the electric signal. A vestigial sideband component suppressing section (59) applies a bias voltage for suppressing an unnecessary one sideband component to the external optical modulator (4) based on the signal level of the vestigial sideband component.

12 Claims, 29 Drawing Sheets

U.S. PATENT DOCUMENTS

| | | | | |
|---|---|---|---|---|
| 2002/0171900 A1* | 11/2002 | Ono et al. | ...................... | 359/181 |
| 2004/0109697 A1* | 6/2004 | Chiappetta | ................... | 398/198 |
| 2004/0136730 A1* | 7/2004 | Fuse et al. | ..................... | 398/188 |
| 2004/0218930 A1* | 11/2004 | Dorrer et al. | ................... | 398/188 |
| 2004/0228602 A1* | 11/2004 | Livas et al. | ................... | 385/140 |
| 2004/0247325 A1* | 12/2004 | Watanabe | ..................... | 398/188 |
| 2005/0008374 A1* | 1/2005 | Taneda | ......................... | 398/198 |
| 2005/0089027 A1* | 4/2005 | Colton | ......................... | 370/380 |
| 2007/0019968 A1* | 1/2007 | Hashimoto et al. | ........... | 398/198 |
| 2007/0134006 A1* | 6/2007 | Krieg | ............................ | 398/198 |
| 2007/0269223 A1* | 11/2007 | Noguchi et al. | .............. | 398/198 |
| 2009/0034988 A1* | 2/2009 | Akiyama et al. | .............. | 398/198 |
| 2009/0201564 A1* | 8/2009 | Tian et al. | ..................... | 359/239 |

FOREIGN PATENT DOCUMENTS

| | | | |
|---|---|---|---|
| JP | 2004-302238 | | 10/2004 |
| JP | 2004-318052 | | 11/2004 |
| JP | 2004318052 | A * | 11/2004 |

\* cited by examiner

F I G. 5
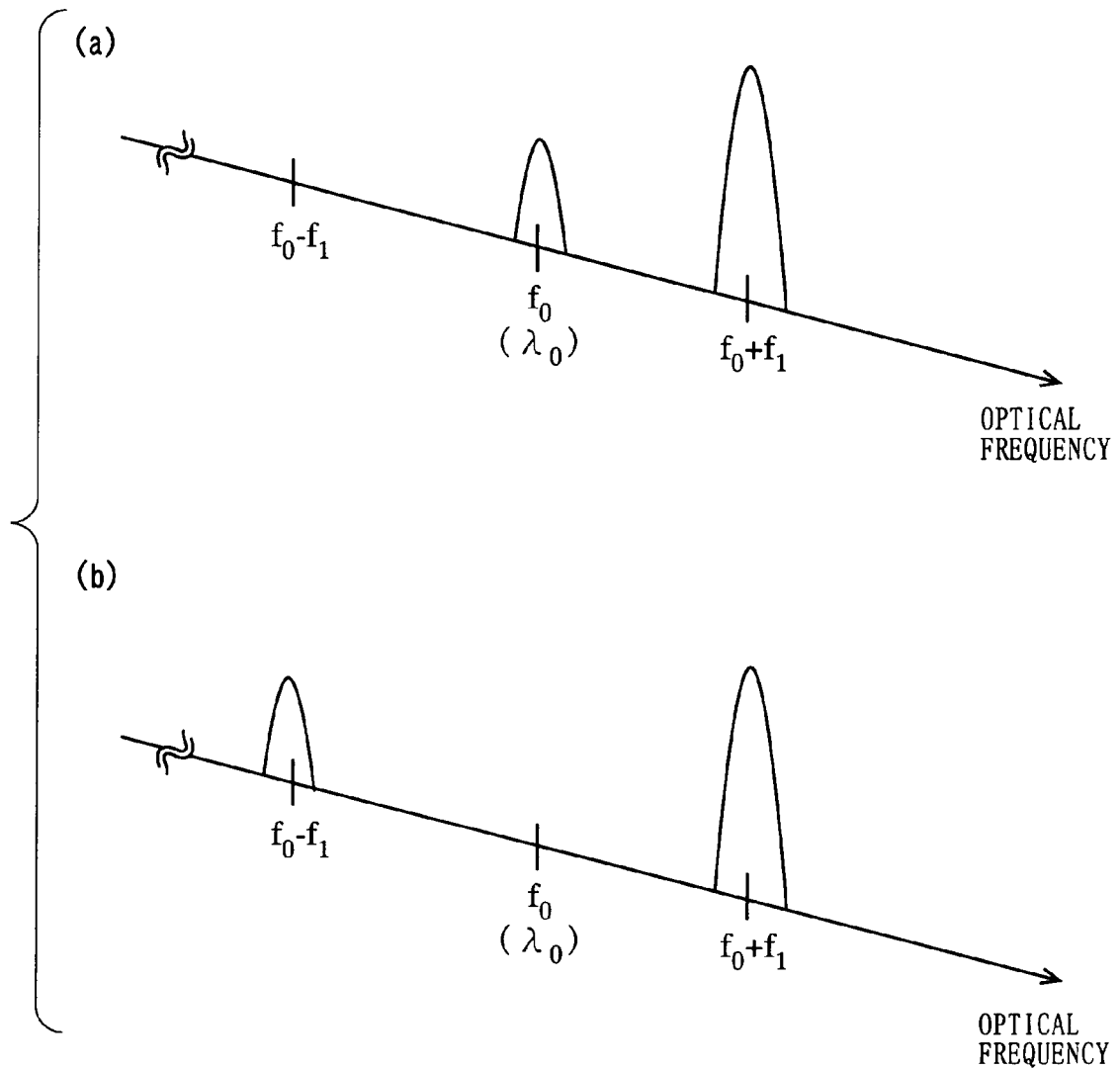

F I G. 1 7
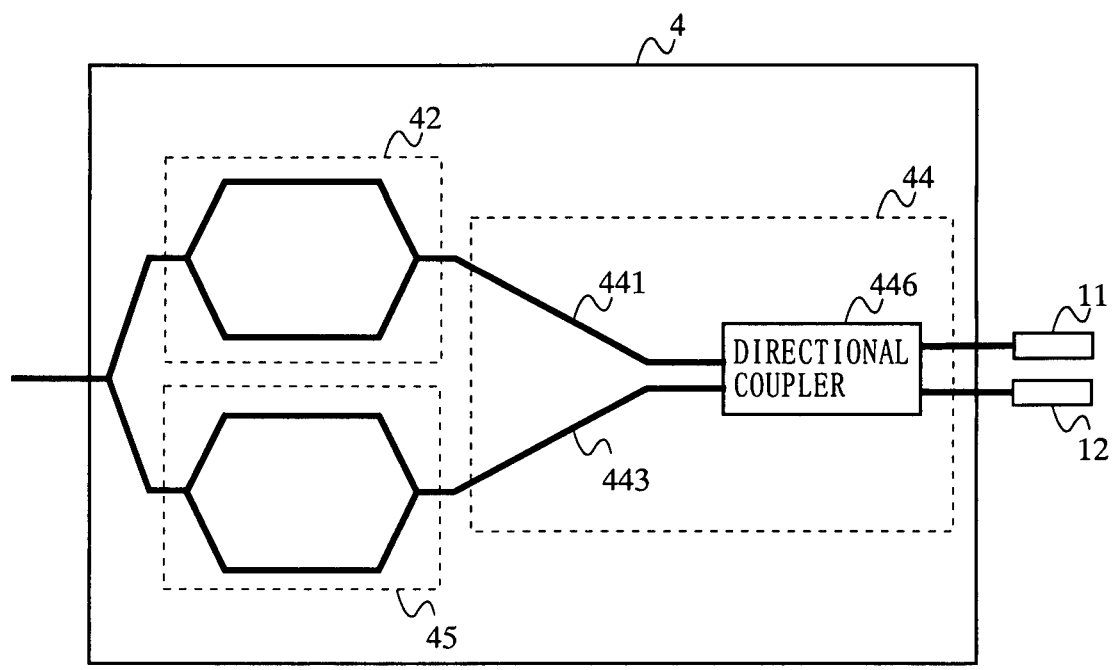

US 8,000,612 B2

OPTICAL TRANSMISSION DEVICE

TECHNICAL FIELD

The present invention relates to an optical transmission device and, more particularly, to an optical transmission device provided with an external optical modulator including a plurality of Mach-Zehnder interferometers for outputting a single-sideband optical intensity-modulated signal with suppressed optical carrier component.

BACKGROUND ART

Conventional optical communications systems employ direct modulation schemes where the current to be injected into a laser diode being a light source is directly modulated with the input signal so that an optical signal modulated with the input signal is outputted. A laser diode experiences a phenomenon (chirping) in which the oscillation wavelength of the laser diode changes due to the chirp characteristics. Therefore, where an optical signal outputted from a laser diode is transmitted over a long distance, the waveform of the optical signal deteriorate and the signal characteristics deteriorate due to the influence of the waveform dispersion in the optical fiber.

Discussions have been made on the use of the millimeter wave band (30-300 GHz), which can easily be reserved, in wireless communications systems in order to significantly increase the transmission rate. Where a coaxial cable is used as a transmission path for communications between base stations in a wireless communications system using the millimeter wave band, a signal of the millimeter wave band has a significant loss along the transmission path. Accordingly, in order to transmit a signal of the millimeter wave band via a coaxial cable, it is necessary to provide amplifiers at intervals on the order of 10 m, thus significantly increasing the cost. Therefore, for the millimeter wave band signal transmission, it is necessary to use an optical fiber with little transmission loss. However, the frequency response characteristic of a currently commercially available laser diode is about 10 GHz. Therefore, the laser diode cannot respond to a signal of a very high frequency such as those in the millimeter waveband. Thus, it is impossible to directly modulate a millimeter wave band signal with a laser diode.

In view of this, it has been proposed in the art to use an optical transmission device provided with a Mach-Zehnder type external optical modulator (hereinafter referred to as an "MZ type modulator") using lithium niobate that has little chirping and is capable of responding to high-frequency signals, in a case where an optical signal is transmitted over a long distance or where a high-frequency signal of the millimeter wave band is transmitted as an optical signal.

FIG. 23 shows a general configuration of the MZ type modulator. An MZ type modulator 900 shown in FIG. 23 includes a crystalline substrate 901, a first optical waveguide 902, a second optical waveguide 903, an electrode 904, an electrode 905, a bias input terminal 906, and an RF (Radio Frequency) signal input terminal 907.

Light outputted from the light source is inputted to the MZ type modulator 900. The input light is branched into two beams for two waveguides, i.e., the first optical waveguide 902 and the second optical waveguide 903. A voltage is applied between the electrode 904 and the electrode 905 provided on the crystalline substrate according to the bias voltage inputted from the bias input terminal 906 and the voltage of the RF signal inputted from the RF signal input terminal 907. If an electric field occurs between the electrode 904 and the electrode 905, the refractive index of the first optical waveguide 902 changes. Light propagating through the first optical waveguide 902 changes its phase as the refractive index of the first optical waveguide 902 changes. Light propagating through the first optical waveguide 902 and that propagating through the second optical waveguide 903 are combined together, whereby the MZ type modulator 900 outputs a signal modulated with an RF signal.

An MZ type modulator experiences a phenomenon (DC drift) in which the relationship between the bias voltage and the optical output varies from the initial state depending on various conditions such as aging and temperature changes. FIG. 24 shows the DC drift occurring in an MZ type modulator. The solid line shown in FIG. 24 represents the initial phase of the MZ type modulator. The one-dot chain line shown in FIG. 24 represents the phase of the MZ type modulator, which has been varied due to the DC drift. As shown in FIG. 24, the signal characteristics of the MZ type modulator deteriorate because the relationship between the bias voltage and the output optical signal level varies due to the DC drift. Patent Document 1 discloses a technique for solving the problem caused by the DC drift of an MZ type modulator.

FIG. 25 shows a configuration of a conventional optical transmission device described in Patent Document 1. The optical transmission device shown in FIG. 25 includes a light source 911, a signal source 912, an amplifier 913, an RF input terminal 914, an MZ external optical modulator 915, a light branching section 916, a light receiving section 917, an amplifier 918, a differential amplifier 919, a reference voltage input terminal 920, and a bias voltage input terminal 921.

With the optical transmission device shown in FIG. 25, the optical carrier outputted from the light source 911 is inputted to the MZ external optical modulator 915. A signal of a predetermined frequency $f_1$ outputted from the signal source 912 is amplified through the amplifier 913 and is inputted to the MZ external optical modulator 915. The MZ external optical modulator 915 outputs an optical signal obtained by modulating the optical carrier with the signal of the frequency $f_1$. The light branching section 916 branches the optical signal into two signals one of which is outputted to the optical transmission path (not shown) and the other to the light receiving section 917 as a monitoring optical signal. The light receiving section 917 converts the monitoring optical signal to an electric signal. The differential amplifier 919 amplifies the difference between the electric signal, which has been amplified through the amplifier 918, and the reference voltage inputted from the bias voltage input terminal 920, and outputs the resulting signal as an error signal. The error signal is inputted to the bias voltage input terminal 921 of the MZ external optical modulator 915. Thus, the optical transmission device shown in FIG. 25 compares the monitoring optical signal with a predetermined reference voltage and controls the bias voltage to be applied to the MZ external optical modulator to thereby control the point of operation.

In recent years, discussions have been made on the use of a single-sideband suppressed-carrier MZ external optical modulator (hereinafter referred to as an "SSB-SC optical modulator") including at least three MZ type modulators as shown in FIG. 23. FIG. 26 is a schematic diagram showing a configuration of an SSB-SC optical modulator. As shown in FIG. 26, an SSB-SC optical modulator 930 includes a first Mach-Zehnder interferometer (hereinafter referred to as an "MZ interferometer") 931, a second MZ interferometer 932, and a third MZ interferometer 933.

The SSB-SC optical modulator shown in FIG. 26 branches an optical carrier inputted from a light source (not shown) into two. One of the branched optical carriers is inputted to the first MZ interferometer 931, and the other to the second MZ interferometer 932. The first MZ interferometer 931 modulates the optical carrier with the RF signal inputted from an RF signal input terminal 935 to output an optically-modulated signal. The second MZ interferometer 932 modulates the optical carrier with the RF signal inputted from an RF signal input terminal 937 to output an optically-modulated signal. The third MZ interferometer 933 adjusts the phase of the optically-modulated signal inputted from the first MZ interferometer 931 by using the bias voltage V3 inputted from a bias input terminal 939, and combines together the phase-adjusted optical signal and the optically-modulated signal inputted from the second MZ interferometer 932. As a result, a single-sideband suppressed-carrier optically-modulated signal is outputted from the SSB-SC optical modulator.

The principle of operation of the SSB-SC optical modulator will now be discussed using arithmetic expressions. The photoelectric field $E_1$ of the optically-modulated signal outputted from the first MZ interferometer 931 is represented by Expression 1 below.

$$
\begin{aligned}
E_1 &= \cos\{\omega_0 t + m\cos\omega_1 t + \phi_{DC1}(V_1)\} + \cos(\omega_0 t - m\cos\omega_1 t) \quad \text{Exp. 1} \\
&= \cos(\omega_0 t + \phi_{DC1}(V_1))\cos(m\cos\omega_1 t) - \sin(\omega_0 t + \phi_{DC1}(V_1)) \\
&\quad \sin(m\cos\omega_1 t) + \cos\omega_0 t\cos(m\cos\omega_1 t) + \sin\omega_0 t\sin(m\cos\omega_1 t) \\
&= J_0(m)\cos(\omega_0 t + \phi_{DC1}(V_1)) - 2J_1(m)\cos\omega_1 t\sin \\
&\quad (\omega_0 t + \phi_{DC1}(V_1)) + J_0(m)\cos\omega_0 t + 2J_1(m)\cos\omega_1 t\sin\omega_0 t \\
&= J_0(m)\{\cos(\omega_0 t + \phi_{DC1}(V_1)) + \cos\omega_0 t\} - 2J_1(m)\cos\omega_1 t \\
&\quad \{\sin(\omega_0 t + \phi_{DC1}(V_1)) - \sin\omega_0 t\} \\
&= J_0(m)\{\cos(\omega_0 t + \phi_{DC1}(V_1)) + \cos\omega_0 t\}
\end{aligned}
$$

$$
- J_1(m)\{\sin((\omega_0 + \omega_1)t + \phi_{DC1}(V_1)) + \sin((\omega_0 - \omega_1)t + \phi_{DC1}(V_1)) - \sin(\omega_0 + \omega_1)t - \sin(\omega_0 - \omega_1)t\}
$$

In Expression 1, $m\cdot\cos(\omega_1 t)$ is the RF signal inputted from the RF signal input terminal 935. In the expression, $\phi_{DC1}(V_1)$ is the phase difference between two light waves passing through the optical waveguides of the first MZ interferometer 931, which is caused by the bias voltage V1 inputted from a bias input terminal 934. In the expression, m is the degree of phase modulation, $\omega_0$ is the angular frequency of the optical carrier to be inputted, $\omega_1$ is the angular frequency of the RF signal. In the expression, $J_n$ is the $n^{th}$-order Bessel function. In the following description, the second-order and subsequent components of the Bessel function are ignored.

The second MZ interferometer 932 receives $m\cdot\sin(\omega_1 t)$, which is obtained through a Hilbert transformation of the RF signal $m\cdot\cos(\omega_1 t)$ inputted to the first MZ interferometer 931 from the RF signal input terminal 937. The photoelectric field $E_2$ of the optical signal outputted from the second MZ interferometer 932 is represented by Expression 2 below.

$$
\begin{aligned}
E_2(t) &= \cos\{\omega_0 t + m\sin\omega_1 t + \phi_{DC2}(V_2)\} + \cos(\omega_0 t - m\sin\omega_1 t) \quad \text{Exp. 2} \\
&= \cos(\omega_0 t + \phi_{DC2}(V_2))\cos(m\sin\omega_1 t) - \sin(\omega_0 t + \phi_{DC2}(V_2)) \\
&\quad \sin(m\sin\omega_1 t) + \cos\omega_0 t\cos(m\sin\omega_1 t) + \sin\omega_0 t\sin(m\sin\omega_1 t) \\
&= J_0(m)\cos(\omega_0 t + \phi_{DC2}(V_2)) - 2J_1(m)\sin\omega_1 t\sin \\
&\quad (\omega_0 t + \phi_{DC2}(V_2)) + J_0(m)\cos\omega_0 t + 2J_1(m)c\sin\omega_1 t\sin\omega_0 t \\
&= J_0(m)\{\cos(\omega_0 t + \phi_{DC2}(V_2)) + \cos\omega_0 t\}
\end{aligned}
$$

$$
- J_1(m)\{\sin((\omega_0 + \omega_1)t + \phi_{DC2}(V_2)) + \cos((\omega_0 - \omega_1)t + \phi_{DC2}(V_2)) + \cos(\omega_0 + \omega_1)t - \cos(\omega_0 - \omega_1)t\}
$$

In Expression 2, $\phi_{DC2}(V_2)$ is the phase difference between two light waves passing through the optical waveguides of the second MZ interferometer 932, which is caused by the bias voltage V2 inputted from a bias input terminal 936. In Expressions 1 and 2, $J_0(m)$ represents the optical carrier component, and the $J_1(m)$ component represents a sideband component. Based on Expressions 1 and 2, the bias voltage that best suppresses the optical carrier component $J_0(\phi)$ is the point where the value $\phi_{DC1}(V_1)$ shown in Expression 1 and the value $\phi_{DC2}(V_2)$ shown in Expression 2 are both $\pi$.

When the values $\phi_{DC1}(V_1)$ and $\phi_{DC2}(V_2)$ are both $\pi$ in Expressions 1 and 2, the photoelectric field $E_3$ of the optically-modulated signal outputted from the third MZ interferometer 933 is represented by Expression 3 below.

$$
\begin{aligned}
E_3 &= 2J_1(m)\{\sin(\omega_o + \omega_l + \varphi_{DC3}(V_3))t + \quad \text{Exp. 3} \\
&\quad \sin(\omega_o - \omega_l + \varphi_{DC3}(V_3))t\} - 2J_1(m)\{\cos(\omega_o + \omega_l)t - \\
&\quad \cos(\omega_o - \omega_l)t\} \\
&= 2J_1(m)\{\sin(\omega_o + \omega_l + \varphi_{DC3}(V_3))t - \cos(\omega_o + \omega_l)t\} + \\
&\quad 2J_1(m)\{\sin(\omega_o - \omega_l + \varphi_{DC3}(V_3))T + \cos(\omega_o - \omega_l)t\}
\end{aligned}
$$

In Expression 3, $\phi_{DC3}(V_3)$ is the phase difference between two optically-modulated signals inputted to the third MZ interferometer 933 caused by the bias voltage V3 inputted from a bias input terminal 938. As shown in Expression 3, it can be seen that the bias voltage with which the optically-modulated signal outputted from the third MZ interferometer 933 is a single-sideband signal with suppressed optical carrier component is the point where $\phi_{DC3}(V_3)$ is $\pi/2$. Thus, with the SSB-SC optical modulator shown in FIG. 26, it is possible to obtain a suppressed-carrier single-sideband optically-modulated signal by operating each MZ interferometer at a predetermined point of operation. FIG. 27 shows a schematic diagram of the spectrum of the optically-modulated signal outputted from the SSB-SC optical modulator.

Patent Document 2 discloses an SSB-SC optical modulator bias controlling method and device for controlling the bias voltage supplied to each MZ interferometer based on a monitoring low-frequency signal superimposed on an optically-modulated signal so as to suppress the DC drift occurring in each MZ interferometer. FIG. 28 shows a configuration of the conventional SSB-SC optical modulator bias controlling device described in Patent Document 2. Referring to FIG. 28, the conventional SSB-SC optical modulator bias controlling device includes the first MZ interferometer 931, the second MZ interferometer 932, the third MZ interferometer 933, a first bias controlling section A, a second bias controlling section B, a third bias controlling section C, and a photodetector 959. The first bias controlling section A controls the bias voltage supplied to the first MZ interferometer 931 and generates a monitoring low-frequency signal fa so that the low-frequency signal fa is superimposed on the optically-modulated signal outputted by the first MZ interferometer 931. The second bias controlling section B controls the bias voltage supplied to the second MZ interferometer 932 and generates a monitoring low-frequency signal fb so that the low-frequency signal fb is superimposed on the optically-modulated signal outputted by the second MZ interferometer 932. The third bias controlling section C controls the bias voltage supplied to the third MZ interferometer 933 and generates a monitoring low-frequency signal fc so that the low-frequency signal fc is superimposed on the optically-modulated signal outputted by the third MZ interferometer 933.

The photodetector 959 detects the optically-modulated signal outputted from the SSB-SC optical modulator.

The first bias controlling section A controls the bias voltage supplied to the first MZ interferometer 931 based on the low-frequency signal fa included in the output signal from the photodetector 959. The second bias controlling section B controls the bias voltage supplied to the second MZ interferometer 932 based on the low-frequency signal fb included in the output signal from the photodetector 959. The third bias controlling section C controls the bias voltage supplied to the third MZ interferometer 933 based on the low-frequency signal fc included in the output signal from the photodetector 959. Thus, the first to third bias controlling sections each control the bias voltage supplied to the corresponding MZ interferometer based on the monitoring low-frequency signal superimposed on the optically-modulated signal, thereby suppressing the DC drift occurring in the MZ interferometer.

Patent Document 1: Japanese Laid-Open Patent Publication No. 6-67128 (page 5, FIG. 1)
Patent Document 2: Japanese Laid-Open Patent Publication No. 2004-318052
Patent Document 3: Japanese Laid-Open Patent Publication No. 2001-133824

DISCLOSURE OF THE INVENTION

Problems to be Solved by the Invention

With the SSB-SC optical modulator shown in FIG. 26, a DC drift occurs in each MZ interferometer. Therefore, it is necessary to control the point of operation of each MZ interferometer. Consider a case where the configuration for controlling the point of operation shown in FIG. 25 is simply applied to the configuration shown in FIG. 26. In such a case, each MZ interferometer is controlled by comparing the level of the output optical signal from the SSB-SC optical modulator with a reference voltage. However, only with the information on the level of the optical signal outputted by the SSB-SC optical modulator shown in FIG. 26, it is very difficult to determine the MZ interferometer of which the point of operation has moved.

In view of this, one may consider a case where the configuration shown in Patent Document 1 is applied to each of the MZ interferometers forming the SSB-SC optical modulator shown in FIG. 26. FIG. 29 shows a case where the configuration shown in Patent Document 1 is applied to each of the MZ interferometers together forming the SSB-SC optical modulator. Referring to FIG. 29, the optical signal outputted from the first MZ interferometer 931 is branched into two signals by a directional coupler 944. One of the branched optical signals is inputted to the third MZ interferometer 933. The other one of the branched optical signals is converted to an electric signal in a light receiving section 945. A differential amplifier 946 amplifies the difference between the converted electric signal and a bias voltage input terminal 947 to produce an error signal. The differential amplifier 946 inputs the error signal to the first MZ interferometer 931. As is the optical signal outputted from the first MZ interferometer 931, the optical signal outputted from the second MZ interferometer 932 is branched into two signals one of which is converted to an electric signal. A differential amplifier 950 amplifies the difference between the converted electric signal and a bias voltage input terminal 951 to produce an error signal. The differential amplifier 950 inputs the error signal to the second MZ interferometer 932. The optical signal outputted from the third MZ interferometer 933 is branched by a light branching section 952 into two signals. One of the branched optical signals is converted to an electric signal in a light receiving section 953. A differential amplifier 954 amplifies the difference between the converted electric signal and the bias voltage input terminal 951 to produce an error signal. The differential amplifier 954 inputs the error signal to the third MZ interferometer 933. Thus, with the SSB-SC optical modulator shown in FIG. 29, the point of operation of each MZ interferometer is controlled by monitoring some of the optical signals outputted by the MZ interferometers.

However, with the configuration shown in FIG. 29, in order to newly introduce a directional coupler for each MZ interferometer, it is necessary to provide an optical waveguide for outputting a monitoring signal from each MZ interferometer. Therefore, with the configuration shown in FIG. 29, it is necessary to re-design the optical waveguide in the SSB-SC optical modulator. Moreover, since it requires the same number of light receiving sections as the number of MZ interferometers, thus increasing the size of the SSB-SC optical modulator.

With the SSB-SC optical modulator bias controlling method and device shown in FIG. 28, a monitoring low-frequency signal needs to be superimposed on the optically-modulated signals outputted from the first MZ interferometer 931, the second MZ interferometer 932 and the third MZ interferometer 933 in order to control the bias voltages supplied to the MZ interferometers. However, when an SSB-SC optical modulator bias controlling method and device as shown in FIG. 28 is applied to a wide-band angle modulation device using optical signal processing disclosed in Patent Document 3 (specifically, an optical intensity modulation section for wide-band optical intensity modulation of optical signals), the monitoring low-frequency signal may possibly give an adverse influence on the low-frequency signal contained in the optically-modulated signal. Thus, it is not suitable for the transmission of low-frequency signals.

The present invention has been made to solve the problems as set forth above, and has an object to provide an SSB-SC optical modulator, with which it is possible to transmit low-frequency signals, it is not necessary to re-design the optical waveguide of the SSB-SC optical modulator, it is possible to reduce the number of light receiving sections for monitoring for controlling the point of operation, and it is possible to control the point of operation of each MZ interferometer.

Solution to the Problems

The present invention is directed to an optical transmission device for outputting a single-sideband optical intensity-modulated signal with suppressed optical carrier component, the optical transmission device including a first, second and third Mach-Zehnder interferometer, each of the first and second Mach-Zehnder interferometers receiving one of two optical signals obtained by branching an optical carrier having a frequency $f_0$ outputted from a light source and outputting a phase-modulated signal obtained by modulating a phase of the input optical signal with an inputted electric signal having a frequency $f_1$, and the third Mach-Zehnder interferometer for further phase-modulating and combining together the two phase-modulated signals outputted from the first and second Mach-Zehnder interferometers. In order to achieve the object set forth above, the optical transmission device includes: a light branching section for branching the optical intensity-modulated signal into an optical signal transmitted along an optical transmission path and a monitoring optical signal; a photodetector section for converting the monitoring optical signal to an electric signal and outputting the electric signal as a monitoring signal; a branching section for branching the monitoring signal into two signals; an optical carrier component extracting section for passing therethrough only a signal component of one of the branched monitoring signals that is in a vicinity of the frequency $f_1$; an optical carrier component level detecting section for detecting a level of the signal outputted by the optical carrier component level extracting section to output an optical carrier component monitoring signal according to the detected level; a vestigial sideband component extracting section for passing therethrough only a signal component of the other one of the branched monitoring signals that is in a vicinity of a frequency $2 \times f_1$; a vestigial sideband component level detecting section for detecting a level of the signal outputted by the vestigial sideband component level extracting section to output a vestigial sideband component monitoring signal according to the detected level; and a suppressing section for controlling bias voltages to be applied to the first and second Mach-Zehnder interferometers based on the optical carrier component monitoring signal so as to suppress an optical carrier component of the optical intensity-modulated signal, and for controlling a bias voltage to be applied to the third Mach-Zehnder interferometer based on the vestigial sideband component monitoring signal so as to suppress an unnecessary one sideband component of the optical intensity-modulated signal.

The present invention provides an optical transmission device including three Mach-Zehnder interferometers for outputting a single-sideband optical intensity-modulated signal with suppressed optical carrier component, wherein the optical transmission device extracts the optical carrier component and the vestigial sideband component contained in a single-sideband optical intensity-modulated signal with suppressed optical carrier component so as to detect the level of the optical carrier component and that of the vestigial sideband component. Then, based on the level of the optical carrier component and that of the vestigial sideband component, the value of the bias voltage to be applied to each Mach-Zehnder interferometer is controlled. Thus, it is possible to suppress the optical carrier component and the vestigial sideband component occurring due to a DC drift of each Mach-Zehnder interferometer, and it is possible to always obtain a stable optical signal with a single-sideband component.

Preferably, the suppressing section includes: an optical carrier component suppressing section for controlling bias voltages to be applied to the first and second Mach-Zehnder interferometers based on the inputted optical carrier component monitoring signal; and a vestigial sideband component suppressing section for controlling a bias voltage to be applied to the third Mach-Zehnder interferometer based on the inputted vestigial sideband component monitoring signal, wherein: the optical carrier component suppressing section includes: a first bias voltage supply section for supplying a bias voltage to be applied to the first Mach-Zehnder interferometer; a second bias voltage supply section for supplying a bias voltage to be applied to the second Mach-Zehnder interferometer; an optical carrier component reference value storing section for storing a reference value for a level of the optical carrier component monitoring signal; an optical carrier component level storing section for storing a level of the inputted optical carrier component monitoring signal; a first bias voltage storing section for storing the bias voltages supplied by the first and second voltage supply sections; an optical carrier component level comparing section for comparing a level of the newly-inputted optical carrier component monitoring signal with the reference value stored in the optical carrier component reference value storing section, and for comparing the level of the newly-inputted optical carrier component monitoring signal with the level of the optical carrier component monitoring signal stored in the optical carrier component level storing section; and a first voltage control section for controlling bias voltages to be applied to the first and second Mach-Zehnder interferometers based on a comparison result from the optical carrier component level comparing section; and the vestigial sideband component detecting section includes: a third bias voltage supply section for supplying a bias voltage to be applied to the third Mach-Zehnder interferometer; a vestigial sideband component reference value storage section for storing a reference value for a level of the vestigial sideband component monitoring signal; a vestigial sideband component level storing section for storing a level of the inputted vestigial sideband component monitoring signal; a third bias voltage storing section for storing the bias voltage supplied by the third voltage supply section; a vestigial sideband component level comparing section for comparing a level of the newly-inputted vestigial sideband component monitoring signal with the reference value stored in the vestigial sideband component reference value storage section, and for comparing the level of the newly-inputted vestigial sideband component monitoring signal with the level of the vestigial sideband component monitoring signal stored in the vestigial sideband component level storing section; and a second voltage control section for controlling a bias voltage to be applied to the third Mach-Zehnder interferometer based on a comparison result from the vestigial sideband component level comparing section.

Preferably, the suppressing section includes: a first bias voltage supply section for supplying a bias voltage to be applied to the first Mach-Zehnder interferometer; a second bias voltage supply section for supplying a bias voltage to be applied to the second Mach-Zehnder interferometer; a third bias voltage supply section for supplying a bias voltage to be applied to the third Mach-Zehnder interferometer; an optical carrier component reference value storing section for storing a reference value for a level of the inputted optical carrier component monitoring signal; a vestigial sideband component reference value storage section for storing a reference value for a level of the inputted vestigial sideband component monitoring signal; a monitoring signal level storing section for storing the level of the optical carrier component monitoring signal and that of the vestigial sideband component monitoring signal; a bias voltage storing section for storing the bias voltages supplied by the first and second voltage supply sections; a monitoring signal level comparing section for comparing level of the newly-inputted optical carrier component monitoring signal with the reference value stored in the optical carrier component reference value storing section and the level of the optical carrier component stored in the optical carrier component level storing section, and for storing the level of the newly-inputted vestigial sideband component monitoring signal with the reference value stored in the vestigial sideband component reference value storage section and the level of the optical carrier component monitoring signal stored in the vestigial sideband component level storing section; and a voltage control section for controlling bias voltages to be applied to the first, second and third Mach-Zehnder interferometers based on a result from the monitoring signal level comparing section.

Thus, it is possible to control the bias voltage to be applied to each Mach-Zehnder interferometer according to the increase/decrease in the level of the optical carrier component and that of the vestigial sideband component. Moreover, the values of the bias voltages applied to the Mach-Zehnder interferometers are stored in a single storage section, and the level of the optical carrier component monitoring signal and that of the vestigial sideband component monitoring signal are stored in a single storage section, whereby it is possible to reduce the size of the optical transmission device.

The bias voltage control section may control bias voltages to be applied to the first and second Mach-Zehnder interferometers so that the level of the optical carrier component monitoring signal is less than or equal to the reference value, and then control a bias voltage to be applied to the third Mach-Zehnder interferometer so that the level of the vestigial sideband component monitoring signal is less than or equal to the reference value. Alternatively, the bias voltage control section may control a bias voltage to be applied to the third Mach-Zehnder interferometer so that the level of the vestigial sideband component monitoring signal is less than or equal to the reference value, and then control bias voltages to be applied to the first and second Mach-Zehnder interferometers so that the level of the optical carrier component monitoring signal is less than or equal to the reference value.

Thus, the order in which the optical carrier component and the vestigial sideband component are suppressed is determined, whereby it is possible to efficiently suppress the bias voltage to be applied to each Mach-Zehnder interferometer.

The light branching section may be a directional coupler provided in the third Mach-Zehnder interferometer for making two of the phase-modulated signals, which have been further phase-modulated, interfere with each other and combining the phase-modulated signals together, so as to output two of the optical intensity-modulated signals; and the optical transmission device may further include a first port for outputting one of the optical intensity-modulated signals outputted by the directional coupler to an optical transmission path, and a second port for outputting the other one of the optical intensity-modulated signals outputted by the directional coupler to the photodetector section.

Thus, as the third Mach-Zehnder interferometer uses the directional coupler for combining together two phase-modulated signals, it is possible to omit the light branching section.

The optical transmission device according to any of claims 1 to 3, wherein the light branching section branches the optical intensity-modulated signal so that an intensity of the optical signal transmitted along an optical transmission path is greater than that of the monitoring optical signal.

Thus, it is possible to suppress the optical carrier component and the vestigial sideband component contained in the optical signal outputted by the optical transmission device without significantly decreasing the intensity of the optical signal transmitted along the optical transmission path.

Effect of the Invention

The present invention provides an optical transmission device including three Mach-Zehnder interferometers for outputting a single-sideband optical intensity-modulated signal with suppressed optical carrier component, wherein the optical transmission device extracts the optical carrier component and the vestigial sideband component contained in a single-sideband optical intensity-modulated signal with suppressed optical carrier component so as to detect the level of the optical carrier component and that of the vestigial sideband component. Then, based on the level of the optical carrier component and that of the vestigial sideband component, the value of the bias voltage to be applied to each Mach-Zehnder interferometer is controlled. Thus, it is possible to suppress the optical carrier component and the vestigial sideband component occurring due to a DC drift of each Mach-Zehnder interferometer, and it is possible to always obtain a stable optical signal with a single-sideband component.

BRIEF DESCRIPTION OF THE DRAWINGS

FIG. 5 is a schematic diagram showing a spectrum of an optical signal outputted by the external optical modulator 4.

FIG. 17 shows the external optical modulator 4 including a directional coupler 446.

DESCRIPTION OF THE REFERENCE CHARACTERS

Figure 1:
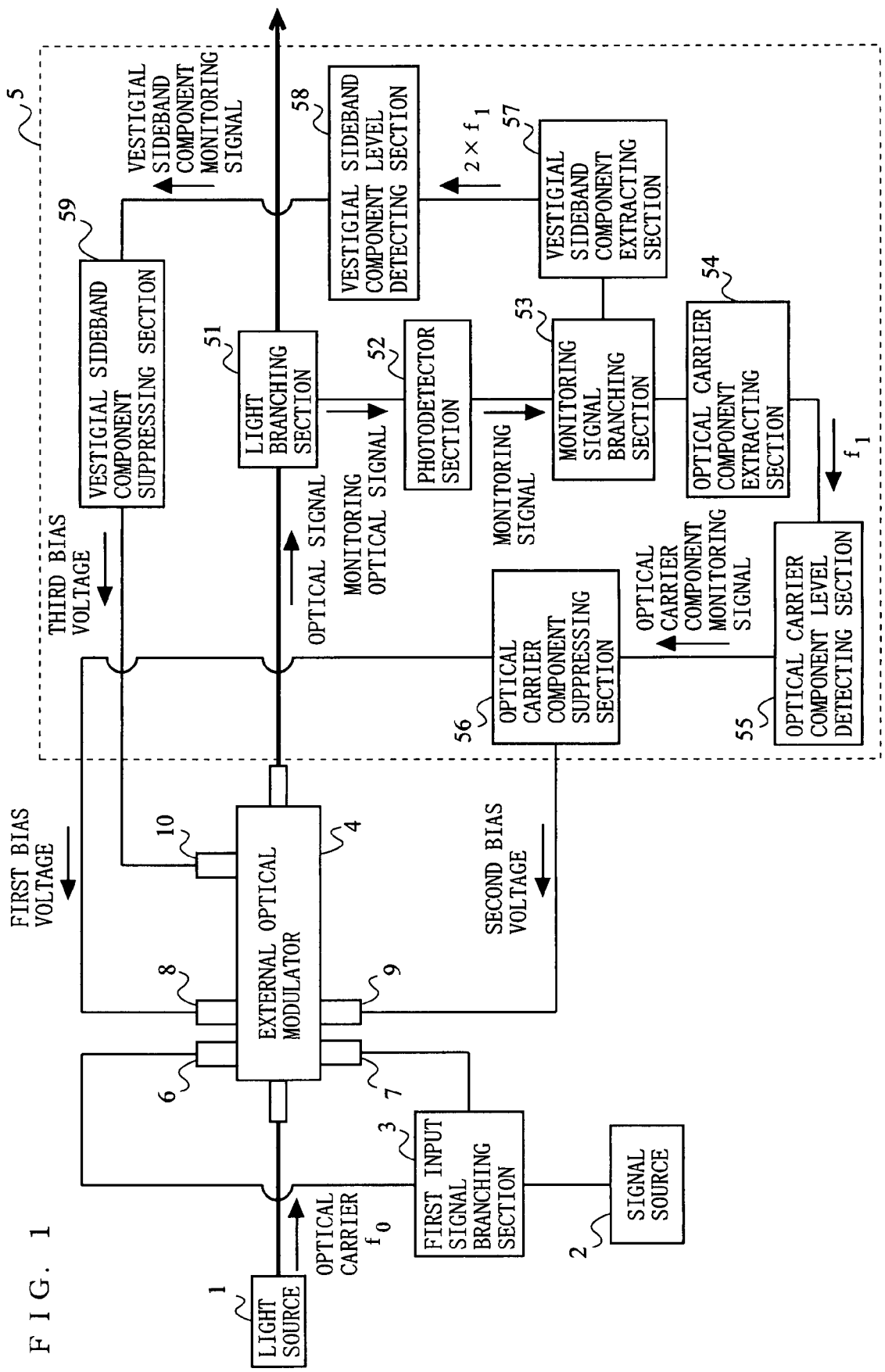
FIG. 1 is a block diagram showing a configuration of an optical transmission device according to a first embodiment of the present invention.

1 Light source
2 Signal source
3 Input signal branching section
4 External optical modulator
5, 13 Modulator operation controlling section
6, 7 RF input terminal
8, 9, 10 Bias voltage input terminal
11, 12 Output port
41, 51, 421, 431 Light branching section
42, 43, 44 MZ interferometer
52 Photodetector section
53 Monitoring signal branching section
54 Optical carrier component extracting section
55 Optical carrier component level detecting section
56 Optical carrier component suppressing section
57 Vestigial sideband component extracting section
58 Vestigial sideband component level detecting section
59 Vestigial sideband component suppressing section
60 Unnecessary component suppressing section
422, 424, 432, 434, 441, 443 Optical waveguide
423, 425, 433, 435, 442, 444 Modulation electrode
426, 436 Optical coupler
427, 437 Input signal branching section
561, 591, 601 Voltage control section
562, 563, 592 Voltage supply section
564, 605 Optical carrier component reference value storing section
565 Optical carrier component level comparing section
566 Optical carrier component level storing section
567, 596, 609 Bias voltage storing section
593, 606 Vestigial sideband component reference value storage section
594 Vestigial sideband component level comparing section
595 Vestigial sideband component level storing section
607 Monitoring signal level comparing section
608 Monitoring signal level storing section

BEST MODE FOR CARRYING OUT THE INVENTION

First Embodiment

FIG. 1 is a block diagram showing a configuration of an optical transmission device according to a first embodiment of the present invention. Referring to FIG. 1, the optical transmission device of the first embodiment includes a light source 1, a signal source 2, a first input signal branching section 3, an external optical modulator 4, a modulator operation controlling section 5, a first RF input terminal 6, a second input terminal 7, a first bias voltage input terminal 8, a second bias voltage input terminal 9, and a third bias voltage input terminal 10.

The light source 1 outputs an unmodulated optical carrier of a frequency $f_0$. The signal source 2 outputs an electric signal of a predetermined frequency $f_1$. The first input signal branching section 3 branches the electric signal outputted from the signal source 2 into two signals, and outputs these signals as a first input signal and a second input signal. The first input signal branching section 3 outputs the first and second input signals while setting a phase difference $\psi$ between the first input signal and the second input signal. Note that the phase difference $\psi$ is preferably $\pi/2$. In such a case, the optical signal outputted from the external optical modulator 4 has one sideband component thereof at the minimum level.

According to the first to third bias voltages supplied from the modulator operation controlling section 5, the external optical modulator 4 outputs an optical signal obtained by intensity-modulating an optical carrier inputted from the light source 1 with two electric signals inputted from the signal source 2 via the electric signal branching section 3, the first RF input terminal 6 and the second RF input terminal 7. The first bias voltage supplied from the modulator operation controlling section 5 is inputted to the first bias voltage input terminal 8. Similarly, the second bias voltage is inputted to the second bias voltage input terminal 9, and the third bias voltage is inputted via the third bias voltage input terminal 10.

The modulator operation controlling section 5 independently determines and outputs the first to third bias voltages to be applied to the external optical modulator 4 via the first bias voltage input terminal 8, the second bias voltage input terminal 9 and the third bias voltage input terminal 10 so that the optical signal outputted from the external optical modulator 4 is a single-sideband component with suppressed optical carrier component. The operation of the modulator operation controlling section 5 will later be described in detail.

Figure 2:
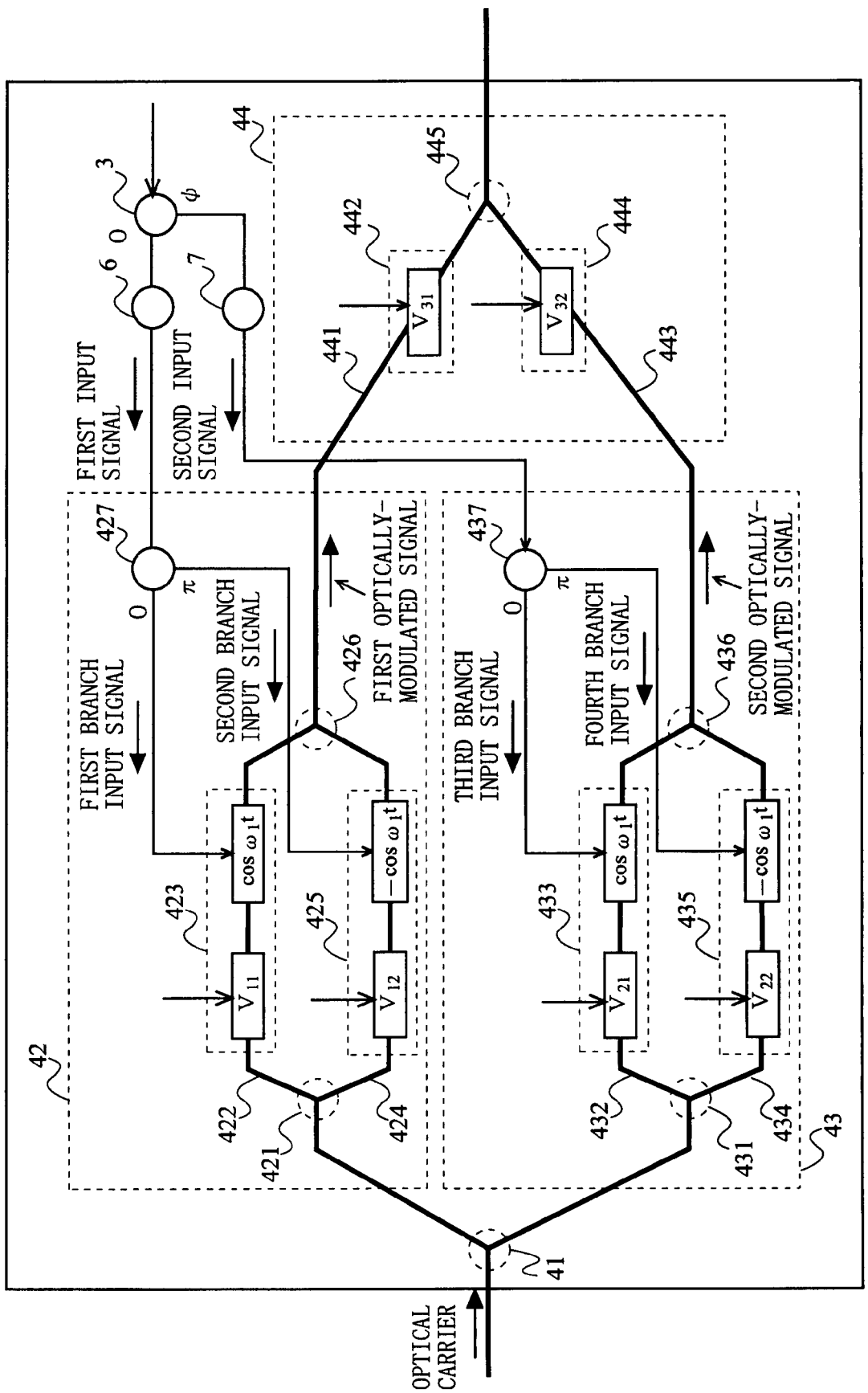
FIG. 2 is a block diagram showing an exemplary configuration of an external optical modulator 4.
Figure 3:
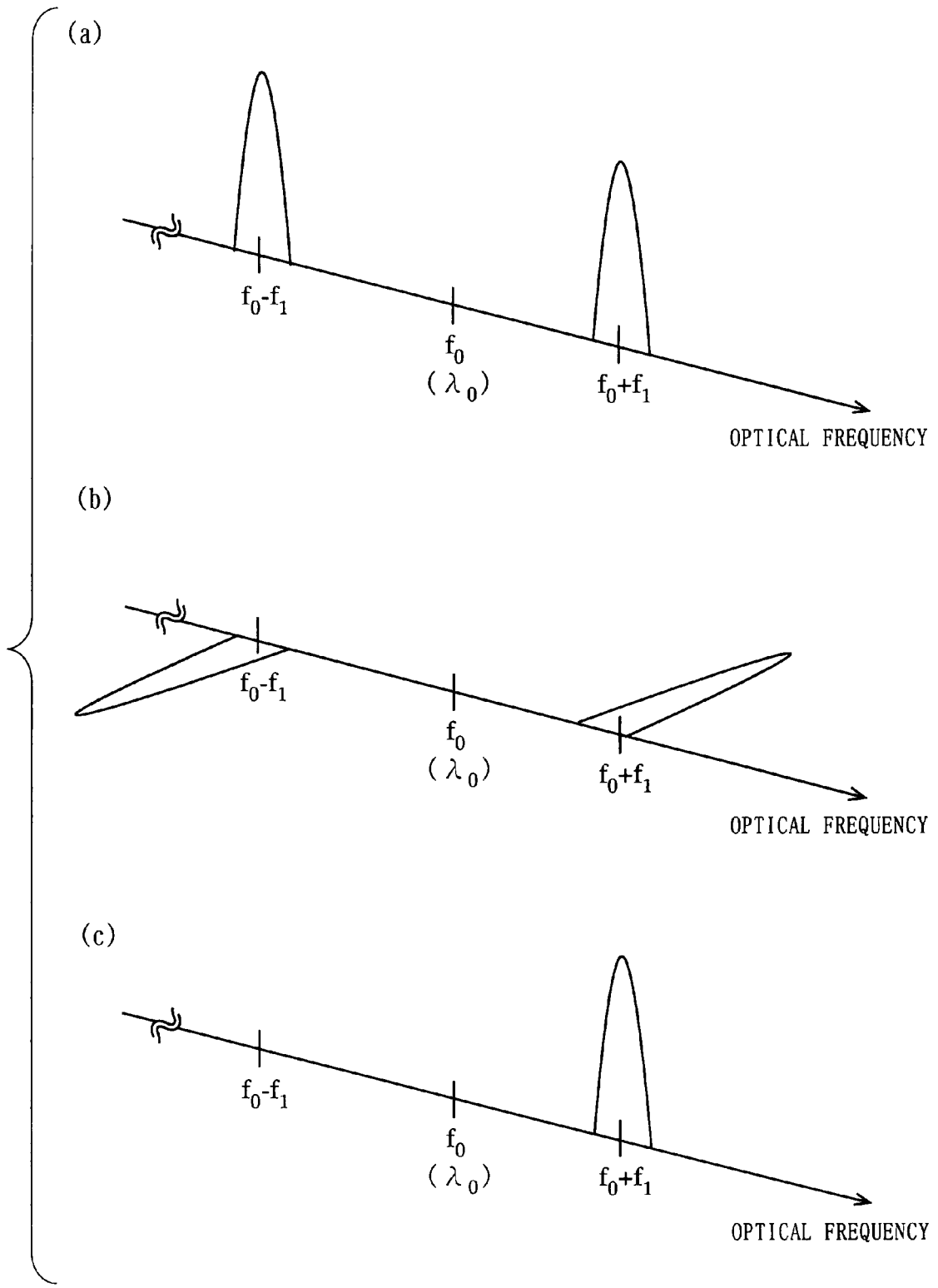
FIG. 3 shows an exemplary optical spectrum of an optically-modulated signal outputted by each of the MZ interferometers together forming the external optical modulator.

Referring to FIGS. 2 and 3, the operation of the external optical modulator 4 will be described. FIG. 2 is a block diagram showing an exemplary configuration of the external optical modulator 4. FIG. 3 shows an exemplary optical spectrum of the output optical signal of each of the MZ interferometers together forming the external optical modulator 4. Referring to FIG. 2, the external optical modulator 4 includes a light branching section 41, a first MZ interferometer 42, a second MZ interferometer 43 and a third MZ interferometer 44. The first MZ interferometer 42, the second MZ interferometer 43 and the third MZ interferometer 44 are MZ interferometers using lithium niobate.

The first light branching section 41 branches the optical carrier inputted from the light source 1 into two signals, and outputs one of them to the first MZ interferometer 42 and the other to the second MZ interferometer 43. The first MZ interferometer 42 and the second MZ interferometer 43 each intensity-modulate the optical carrier with the electric signal inputted from the first input signal branching section 3, and output the modulated signal to the third MZ interferometer 44. The third MZ interferometer 44 combines together the optical signals outputted from the first MZ interferometer 42 and the second MZ interferometer 43 while adjusting the phase relationship therebetween, and outputs the optical signal out of the external optical modulator 4.

The first MZ interferometer 42 includes a second light branching section 421, a first optical waveguide 422, a first modulation electrode 423, a second optical waveguide 424, a second modulation electrode 425, a first optical coupler section 426, and a second input signal branching section 427.

The first modulation electrode 423 is provided for the first optical waveguide 422. The second modulation electrode 425 is provided for the second optical waveguide 424.

In the first MZ interferometer 42, the second light branching section 421 branches the optical carrier outputted from the first light branching section 41 into two signals, and outputs one of them to the first optical waveguide 422 and the other to the second optical waveguide 424. The second input signal branching section 427 branches the input signal inputted via the first RF input terminal 6 into two to output first and second branch input signals. The second input signal branching section 427 inputs the first branch input signal to the first modulation electrode 423 and the second branch input signal to the second modulation electrode 425. The refractive index of the first optical waveguide 422 and the second optical waveguide 424 varies as the bias voltage applied to the first modulation electrode 423 and the second modulation electrode 425 (hereinafter referred to as the "first applied bias voltage") changes. The optical carrier propagating through the first optical waveguide 422 is phase-modulated by the change in the refractive index of the optical waveguide, and is inputted to the first optical coupler section 426 as an optical phase-modulated signal. The optical carrier propagating through the second optical waveguide 424 is similarly phase-modulated, and is inputted to the first optical coupler section 426 as an optical phase-modulated signal. The first optical coupler section 426 combines together the inputted two optical phase-modulated signals. The two optical phase-modulated signals interfere with each other to thereby become a first optically-modulated signal whose optical intensity is modulated. The first optically-modulated signal is inputted to the third MZ interferometer 44.

The first applied bias voltage is produced by the first and second branch input signals and the first bias voltage ($V_{11}$, $V_{12}$). The average phase difference between the first and second branch input signals is set to $\pi$. The first bias voltage ($V_{11}$, $V_{12}$) is inputted via the first bias voltage input terminal 8. The value of the first bias voltage ($V_{11}$, $V_{12}$) is set so that the average phase difference $\phi$ between the two optical phase-modulated signals is $\pi$, so as to output a double-sideband optical signal in which the optical carrier component of the first optically-modulated signal is suppressed.

The two optical phase-modulated signals are thus phase-modulated and inputted to the first optical coupler section 426. The two optical phase-modulated signals interfere with each other to be thereby converted to a double-sideband optically-modulated signal with suppressed optical carrier. FIG. 3(a) shows an exemplary optical spectrum of a first optically-modulated signal outputted from the first MZ interferometer 42. As shown in FIG. 3(a), the first optically-modulated signal is a double-sideband optically-modulated signal with suppressed optical carrier component having an optical frequency $f_0$.

The second MZ interferometer 43 includes a third light branching section 431, a third optical waveguide 432, a third modulation electrode 433, a fourth optical waveguide 434, a fourth modulation electrode 435, a second optical coupler section 436, and a third input signal branching section 437. The third modulation electrode 433 is provided for the third optical waveguide 432. The fourth modulation electrode 435 is provided for the fourth optical waveguide 434.

In the second MZ interferometer 43, the third light branching section 431 branches the optical carrier outputted from the second light branching section 41 into two signals, and outputs one of them to the second optical waveguide 432 and the other to the third optical waveguide 434. The third input signal branching section 437 branches the input signal inputted via the second RF input terminal 6 into two to output second and third branch input signals. The third input signal branching section 437 inputs the third branch input signal to the third modulation electrode 433 and the fourth branch input signal to the fourth modulation electrode 435. The refractive index of the third optical waveguide 432 and the fourth optical waveguide 434 varies as the bias voltage applied to the third modulation electrode 433 and the fourth modulation electrode 435 (hereinafter referred to as the "second applied bias voltage") changes. The optical carrier propagating through the third optical waveguide 432 is phase-modulated by the change in the refractive index of the optical waveguide, and is inputted to the second optical coupler section 436 as an optical phase-modulated signal. The optical carrier propagating through the fourth optical waveguide 434 is similarly phase-modulated, and is inputted to the second optical coupler section 436 as an optical phase-modulated signal. The second optical coupler section 436 combines together the inputted two optical phase-modulated signals. The two optical phase-modulated signals interfere with each other to thereby become a second optically-modulated signal whose optical intensity is modulated. The second optically-modulated signal is inputted to the third MZ interferometer 44.

The second applied bias voltage is produced by the third and fourth branch input signals and the second bias voltage ($V_{21}$, $V_{22}$). The average phase difference between the third and fourth branch input signals is set to $\pi$. The second bias voltage ($V_{21}$, $V_{22}$) is inputted via the second bias voltage input terminal 9. The value of the second bias voltage ($V_{21}$, $V_{22}$) is set so that the average phase difference E between the two optical phase-modulated signals is $\pi$, so as to output a double-sideband optical signal in which the optical carrier component of the second optically-modulated signal is suppressed.

The two optical phase-modulated signals are thus phase-modulated and inputted to the second optical coupler section 436. The two optical phase-modulated signals interfere with each other to be thereby converted to a double-sideband optically-modulated signal with suppressed optical carrier. FIG. 3(b) shows an exemplary optical spectrum of a second optically-modulated signal outputted from the second MZ interferometer 43. As shown in FIG. 3(b), the second optically-modulated signal is a double-sideband optically-modulated signal with suppressed optical carrier component having an optical frequency $f_0$.

The third MZ interferometer 44 includes a fifth optical waveguide 441, a fifth modulation electrode 442, a sixth optical waveguide 443, a sixth modulation electrode 444, and a third optical coupler section 445. The fifth modulation electrode 442 is provided for the fifth optical waveguide 441. The sixth modulation electrode 444 is provided for the sixth optical waveguide 443.

The refractive index of the fifth optical waveguide 441 and the sixth optical waveguide 443 varies as the bias voltage applied to the fifth modulation electrode 442 and the sixth modulation electrode 444 (hereinafter referred to as the "third applied bias voltage") changes. The first optically-modulated signal is inputted to the fifth optical waveguide 441 from the first MZ interferometer 42. The first optically-modulated signal is phase-modulated by the change in the refractive index of the optical waveguide, and is inputted to the third optical coupler section 445 as an optical phase-modulated signal. The second optically-modulated signal is inputted to the sixth optical waveguide 443 from the second MZ interferometer 43. The second optically-modulated signal is phase-modulated by the change in the refractive index of the optical waveguide, and is inputted to the third optical coupler section 445 as an optical phase-modulated signal. The third optical coupler section 445 combines together the inputted two optical phase-modulated signals. The two optical phase-modulated signals to be combined interfere with each other to thereby become a third optically-modulated signal whose optical intensity is modulated. The third optically-modulated signal is the optical signal outputted by the external optical modulator 4.

The third applied bias voltage is a third bias voltage ($V_{31}$, $V_{32}$) inputted via the third bias voltage input terminal 10. The value of the third bias voltage ($V_{31}$, $V_{32}$) is set so that the average phase difference between the two optical phase-modulated signals inputted to the third optical coupler section is $\pi/2$, in order for the third optically-modulated signal to be a single-sideband modulated signal with suppressed optical carrier component. FIG. 3(c) shows an exemplary spectrum of the third optically-modulated signal. As shown in FIG. 3(c), the third optically-modulated signal is a single-sideband optically-modulated signal with suppressed optical carrier component. Where the third optically-modulated signal is a single-sideband optically-modulated signal with suppressed optical carrier component, the first and second optically-modulated signals inputted to the third MZ interferometer 44 is preferably a double-sideband optically-modulated signal with suppressed optical carrier component.

A detailed configuration of the modulator operation controlling section 5 will be described with reference to FIG. 1. The modulator operation controlling section 5 includes a light branching section 51, a photodetector section 52, a monitoring signal branching section 53, an optical carrier component extracting section 54, an optical carrier component level detecting section 55, an optical carrier component suppressing section 56, a vestigial sideband component extracting section 57, a vestigial sideband component level detecting section 58, and a vestigial sideband component suppressing section 59.

The light branching section 51 branches the optical signal outputted from the external optical modulator 4 into two signals. One of the optical signals is transmitted via the optical transmission path (not shown). The other optical signal is inputted to the photodetector section 52 as a monitoring optical signal. The light branching section 51 preferably branches the optical signal outputted from the external optical modulator 4 so that the intensity of the optical signal transmitted along the optical transmission path is greater than that of the optical signal inputted to the photodetector section 52.

The photodetector section 52 converts the monitoring optical signal to an electric signal, and outputs the converted signal as a monitoring signal. The photodetector section 52 may employ a photodiode, or the like, having a squared detection property. The photodetector section 52 detects an optical signal, in squared detection, and converts the detected signal to an electric signal. The monitoring signal branching section 53 branches the monitoring signal into two signals, and inputs one of them to the optical carrier component extracting section 54 and the other to the vestigial sideband component extracting section 57.

The optical carrier component extracting section 54 may be a filter, or the like. The optical carrier component extracting section 54 extracts and outputs a signal component in the vicinity of the frequency $f_1$ from the electric signal outputted from the monitoring signal branching section 53. FIG. 4(a) shows the pass band of the optical carrier component extracting section 54. The optical carrier component level detecting section 55 detects the level of the signal component in the vicinity of the frequency $f_1$, which has been extracted by the optical carrier component extracting section 54, and outputs the detection signal to the optical carrier component suppressing section as the optical carrier component monitoring signal.

The optical carrier component suppressing section 56 adjusts the operation condition of the external optical modulator 4 according to the level of the optical carrier component monitoring signal. The optical carrier component suppressing section 56 determines and outputs the first bias voltage to be applied via the first bias voltage input terminal 8 and the second bias voltage to be applied via the second bias voltage input terminal 9 so that the level of the detection signal inputted from the optical carrier component level detecting section 55 is less than or equal to a predetermined reference value.

The vestigial sideband component extracting section 57 may be a filter, or the like. The vestigial sideband component extracting section 57 extracts and outputs a signal component in the vicinity of the frequency $2 \times f_1$ from the electric signal outputted from the monitoring signal branching section 53. FIG. 4(b) shows the pass band of the vestigial sideband component extracting section 57. The vestigial sideband component level detecting section 58 detects the level of the signal component in the vicinity of the frequency $2 \times f_1$, which has been extracted by the vestigial sideband component extracting section 57, and outputs the detection signal to the vestigial sideband component suppressing section 59 as the vestigial sideband component monitoring signal.

The vestigial sideband component suppressing section 59 adjusts the operation condition of the external optical modulator 4 according to the level of the vestigial sideband component monitoring signal. The vestigial sideband component suppressing section 59 determines and outputs the third bias voltage to be applied via the third bias voltage input terminal 10 so that the level of the detection signal inputted from the vestigial sideband component level detecting section 58 is less than or equal to a predetermined reference value.

The operation of the modulator operation controlling section 5 will now be described in detail. As described above, the external optical modulator 4 includes three MZ interferometers. With each MZ interferometer in the external optical modulator 4, the optical spectrum of the output signal varies depending on the input bias voltage. In order for the optical signal outputted from the external optical modulator 4 to be a single-sideband optically-modulated signal with suppressed optical carrier component, it is necessary to optimally set the bias voltage to be inputted to each MZ interferometer. However, the optimal state of an MZ interferometer varies due to a DC drift. FIG. 5 is a schematic diagram showing the spectrum of the optical signal outputted by the external optical modulator 4. FIG. 5(a) is a schematic diagram showing the spectrum of the optical signal outputted by the external optical modulator 4 in a case where there remains an optical carrier component. FIG. 5(b) is a schematic diagram showing the spectrum of the optical signal outputted by the external optical modulator 4 in a case where there remains an unnecessary one sideband component (hereinafter the "vestigial sideband component"). The modulator operation controlling section 5 controls the bias voltage applied to each MZ interferometer of the external optical modulator in order to suppress an unnecessary component as shown in FIG. 5.

First, the operation of the optical carrier component suppressing section 56 will be described. The optical carrier component suppressing section 56 is a circuit for controlling the first bias voltage to be applied to the first MZ interferometer 42 of the external optical modulator 4 and the second bias voltage to be applied to the second MZ interferometer 43 in order to suppress the optical carrier component remaining in the optical signal outputted by the external optical modulator 4.

Figure 4:
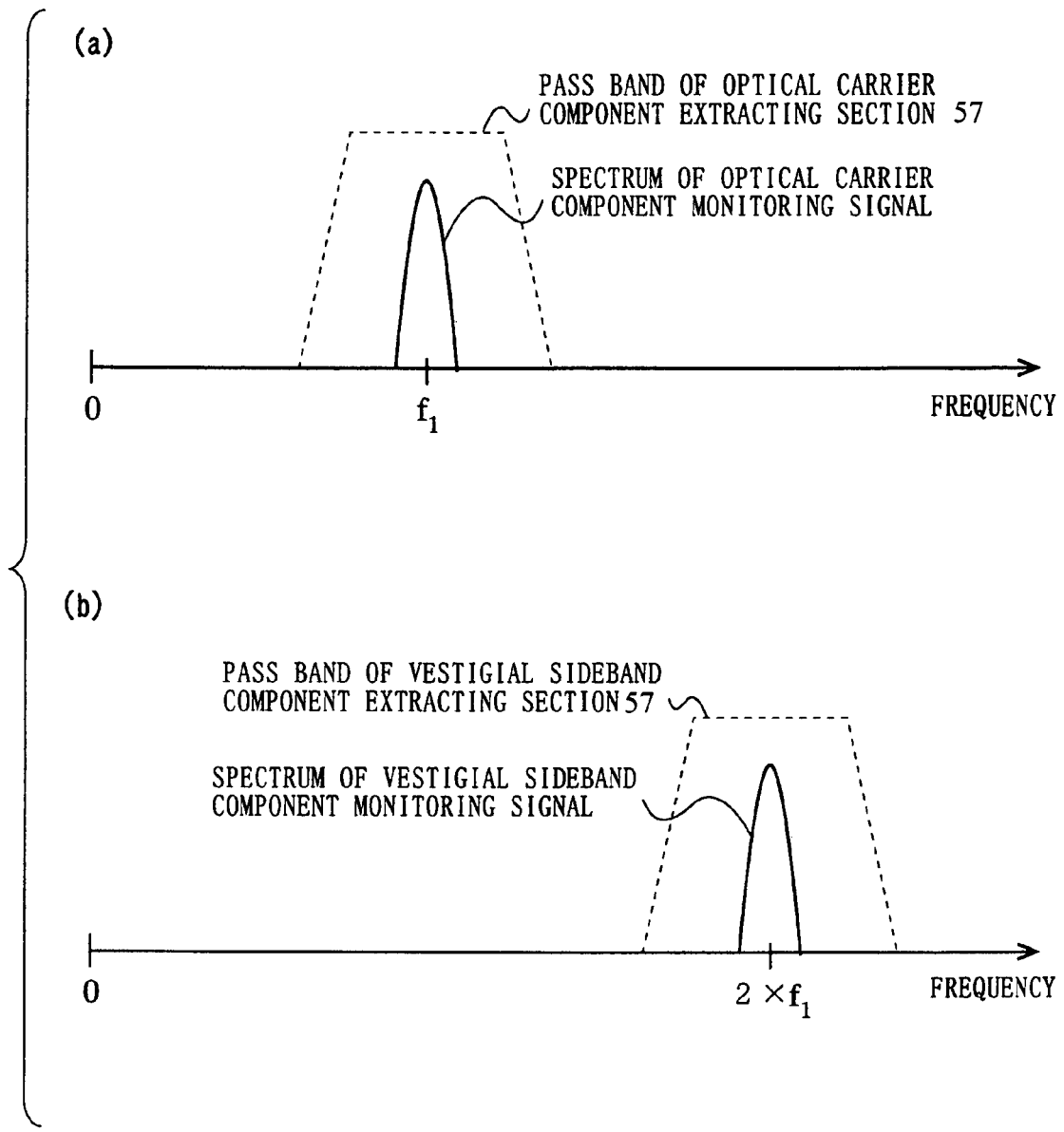
FIG. 4 is a schematic diagram showing the pass band of an optical carrier component extracting section 54 and that of a vestigial sideband component extracting section.

In a case where an optical carrier component remains in the optical signal outputted by the external optical modulator 4, the photodetector section 52 produces the difference beat signal between one sideband component and the remaining optical carrier component and outputs the produced signal as an optical carrier component monitoring signal. The optical carrier component monitoring signal contains a component of the frequency $f_1$. FIG. 4(*a*) shows an exemplary spectrum of the optical carrier component monitoring signal. The optical carrier component monitoring signal indicates that the optimal point of operation of the first MZ interferometer 42 or the second MZ interferometer 43 has varied due to a DC drift. As a result, the quality of the optical signal outputted by the external optical modulator 4 deteriorates.

Therefore, in a case where the level of the optical carrier component monitoring signal having a component of the frequency $f_1$ is greater than or equal to a predetermined reference value, the optical carrier component suppressing section 56 adjusts the first bias voltage and the second bias voltage to be applied to the external optical modulator 4 so that the level of the optical carrier component monitoring signal is minimized.

Figure 6:
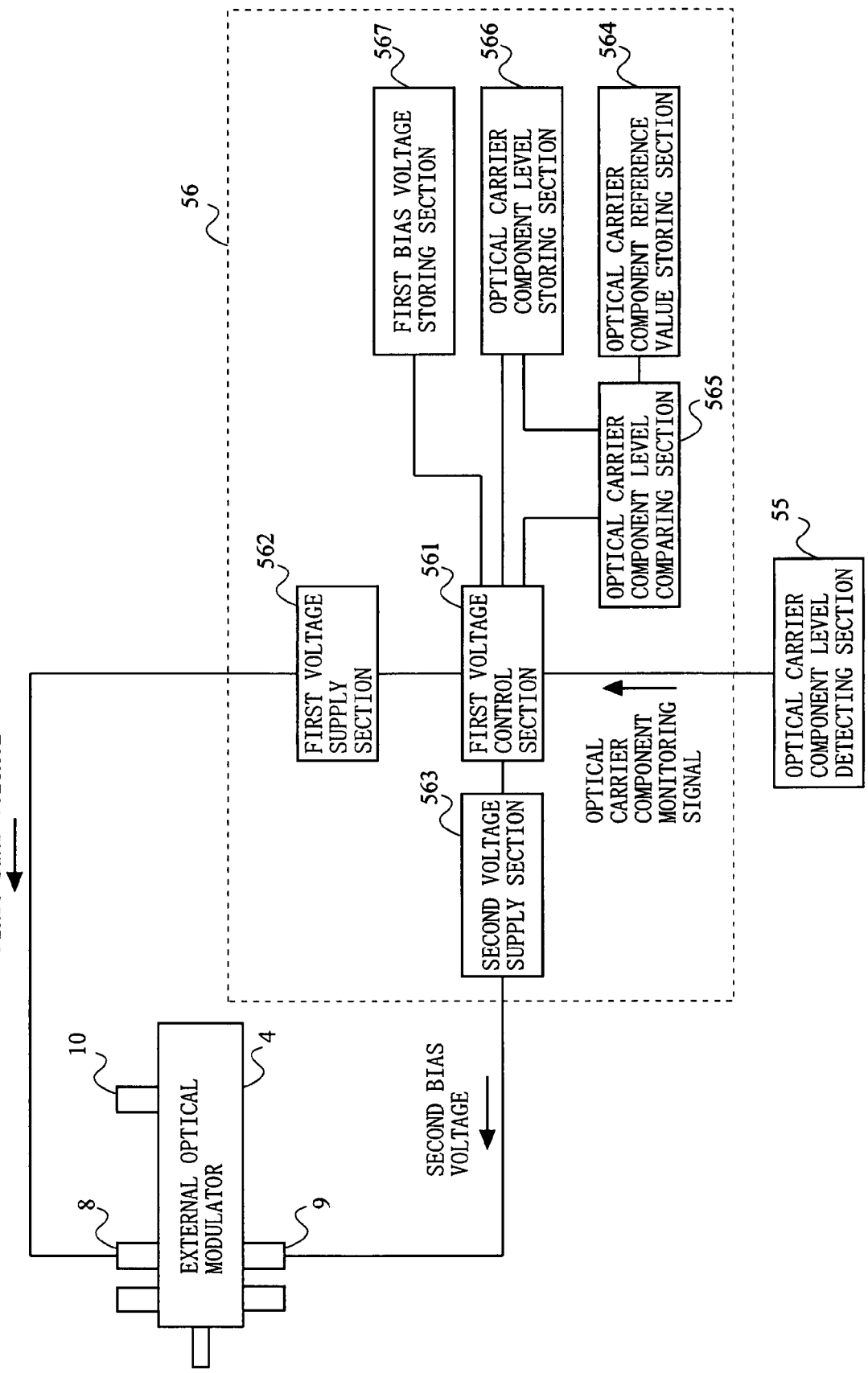
FIG. 6 is a block diagram showing a configuration of an optical carrier component suppressing section 56.

FIG. 6 is a block diagram showing a configuration of the optical carrier component suppressing section 56. The optical carrier component suppressing section 56 includes a first voltage control section 561, a first voltage supply section 562, a second voltage supply section 563, an optical carrier component reference value storing section 564, an optical carrier component level comparing section 565, an optical carrier component level storing section 566, and a first bias voltage storing section 567. FIG. 6 does not show elements other than the optical carrier component suppressing section 56.

The first voltage control section 561 controls the optical carrier component suppressing section 56. The first voltage supply section 562 supplies the first bias voltage to be inputted to the first bias voltage input terminal 8. The second voltage supply section 563 supplies the second bias voltage to be inputted to the second bias voltage input terminal 9. The optical carrier component reference value storing section 564 stores the reference value of the level of the optical carrier component monitoring signal. The optical carrier component level comparing section 565 compares the level of the optical carrier component monitoring signal with the reference value. The optical carrier component level storing section 566 stores the level of the optical carrier component monitoring signal. The first bias voltage storing section 567 stores the first bias voltage value.

Figure 7:
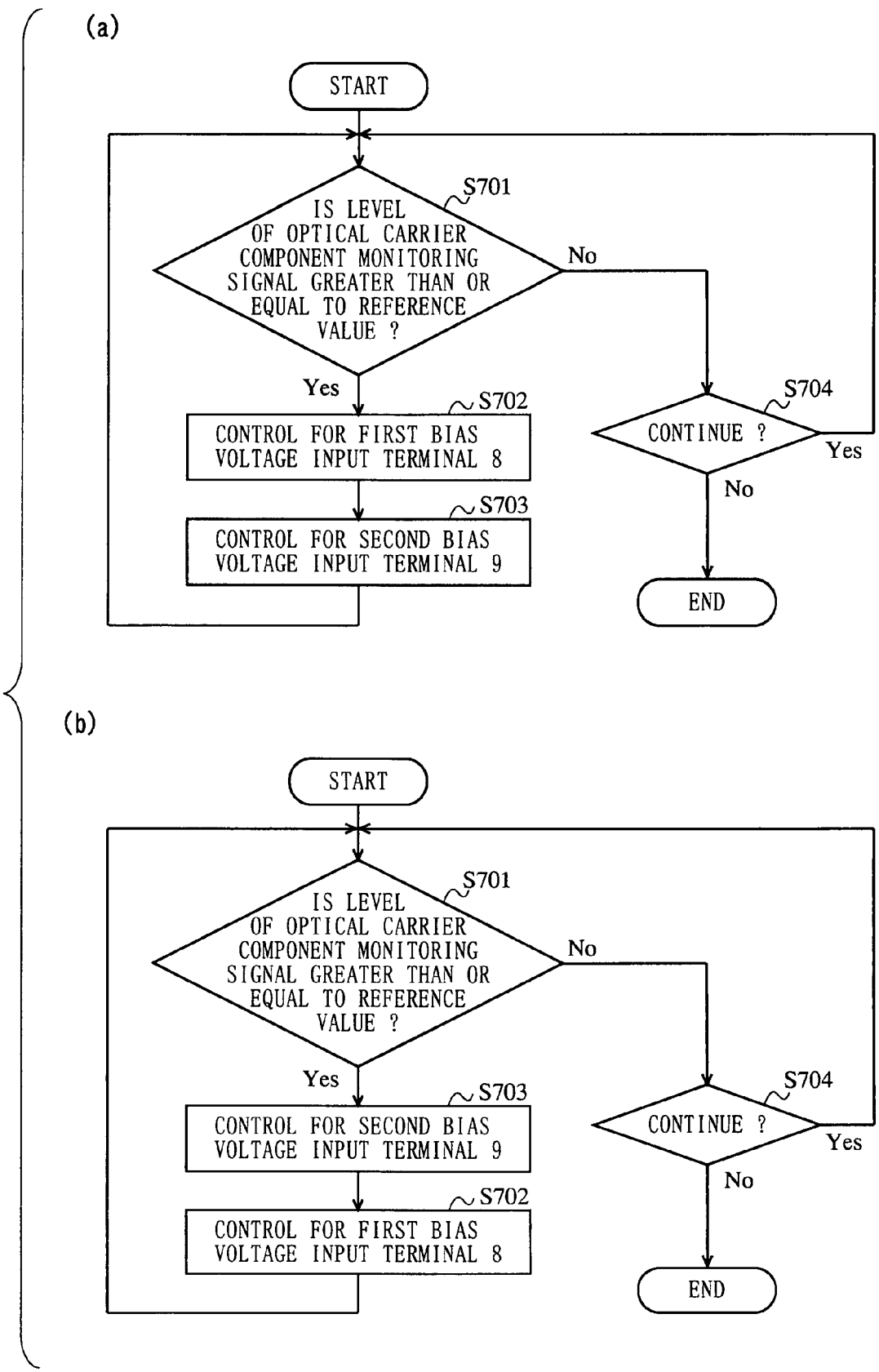
FIG. 7 is a flow chart showing a process performed by the optical carrier component suppressing section 56.

The process performed by the optical carrier component suppressing section 56 will be described with reference to FIGS. 7 to 10. FIG. 7(*a*) is a flow chart showing a process performed by the optical carrier component suppressing section 56. Referring to FIG. 7(*a*), when an optical carrier component monitoring signal of the frequency $f_1$ is inputted to the optical carrier component suppressing section 56, the optical carrier component level comparing section 565 compares the level of the optical carrier component monitoring signal with the reference value stored in the optical carrier component reference value storing section 564 (step S701).

If the level of the optical carrier component monitoring signal is greater than the reference value (Yes in step S701), the optical carrier component suppressing section 56 controls the first bias voltage to be inputted to the first bias voltage input terminal 8 (step S702). Next, the optical carrier component suppressing section 56 controls the second bias voltage to be inputted to the second bias voltage input terminal 9 (step S703). After the process in step S703, the optical carrier component suppressing section 56 returns to step S701. If the level of the optical carrier component monitoring signal is smaller than the reference value (No in step S701), the optical carrier component suppressing section 56 determines whether or not to continue the process of determining the level of the optical carrier component monitoring signal. If it is determined that the determination process is to be continued, the process returns to step S701. If the determination process is not to be continued, the optical carrier component suppressing section 56 exits the process. The optical carrier component suppressing section 56 may proceed to step S704 after performing the process of step S703. The order in which steps S702 and S703 are performed may be reversed. In such a case, there is no influence on the final result from the process performed by the optical carrier component suppressing section 56 shown in FIG. 7(*a*). FIG. 7(*b*) shows a flow chart for a case where the order of steps S702 and S703 is reversed.

Figure 8:
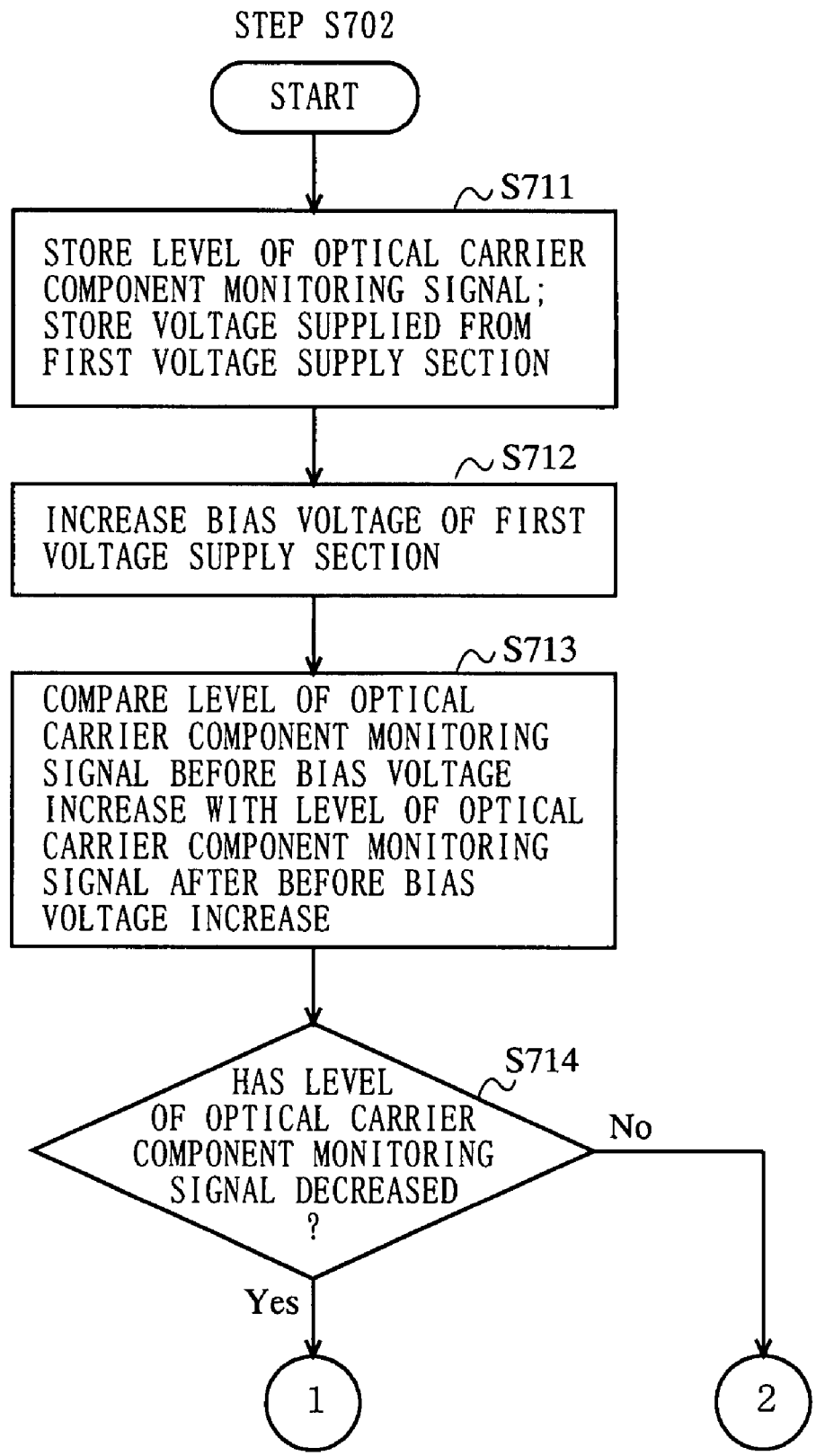
FIG. 8 is a flow chart showing in detail a process performed by the optical carrier component suppressing section 56 in step S702.

FIG. 8 shows in detail the process of the optical carrier component suppressing section 56 in step S702 shown in FIG. 7. In the optical carrier component suppressing section 56, the first voltage control section 561 stores the level of the inputted optical carrier component monitoring signal in the optical carrier component level storing section 566 and stores the first bias voltage value supplied by the first voltage supply section 562 to the first bias voltage input terminal 8 in the first bias voltage storing section 567 (step S711). The first voltage control section 561 increases the first bias voltage by a predetermined voltage (step S712).

After the process of step S712 is performed, the optical carrier component suppressing section 56 receives the optical carrier component monitoring signal after the first bias voltage increase. The optical carrier component level comparing section 565 compares the level of the optical carrier component monitoring signal before the bias voltage increase with the level of the optical carrier component monitoring signal after the first bias voltage increase (step S713). The first voltage control section 561 determines, based on the comparison result from the optical carrier component level comparing section 565, whether the level of the optical carrier component monitoring signal after the first bias voltage increase has decreased (step S714).

Figure 9:
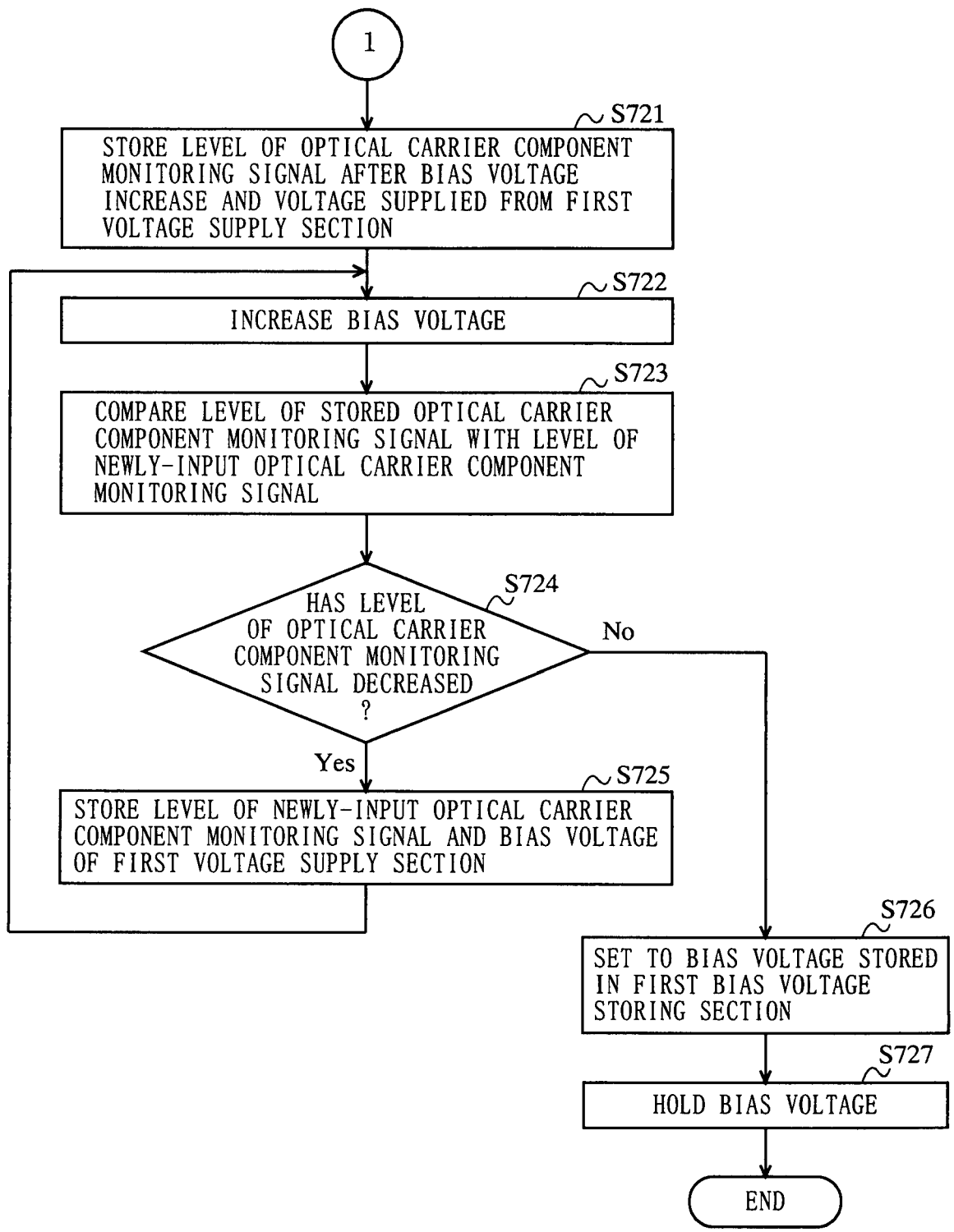
FIG. 9 is a flow chart showing an operation of the optical carrier component suppressing section 56 in a case where the level of the optical carrier component monitoring signal decreases.

FIG. 9 is a flow chart showing the operation of the optical carrier component suppressing section 56 in a case where the first voltage control section 561 determines in step S714 that the level of the optical carrier component monitoring signal after the first bias voltage increase has decreased (Yes in step S714). The first voltage control section 561 stores the level of the optical carrier component monitoring signal after the first bias voltage increase and the first bias voltage value in the optical carrier component level storing section 566 and the first bias voltage storing section 567, respectively (step S721). The first voltage control section 561 further increases the first bias voltage by a predetermined voltage value (step S722).

When an optical carrier component monitoring signal is newly inputted to the optical carrier component suppressing section 56 after the first voltage supply section 562 further increases the first bias voltage, the optical carrier component level comparing section 565 compares the level of the newly-inputted optical carrier component monitoring signal with the level of the optical carrier component monitoring signal stored in the optical carrier component level storing section 566 (step S723). Based on the comparison result from the optical carrier component level comparing section 565, the first voltage control section 561 determines whether the level of the newly-inputted optical carrier component monitoring signal has decreased (step S724).

If it is determined in step S724 that the level of the optical carrier component monitoring signal has decreased, the first voltage control section 561 stores the level of the newly-inputted optical carrier component monitoring signal and the first bias voltage value in the optical carrier component level storing section 566 and the first bias voltage storing section 567, respectively (step S725), and the process returns to step S722.

If it is determined in step S724 that the level of the optical carrier component monitoring signal has increased, the first voltage control section 561 sets the first bias voltage to the bias voltage value stored in the first bias voltage storing section 567 (step S726). The first voltage control section 561 holds the current value of the first bias voltage value (step S727), and the process ends.

Figure 10:
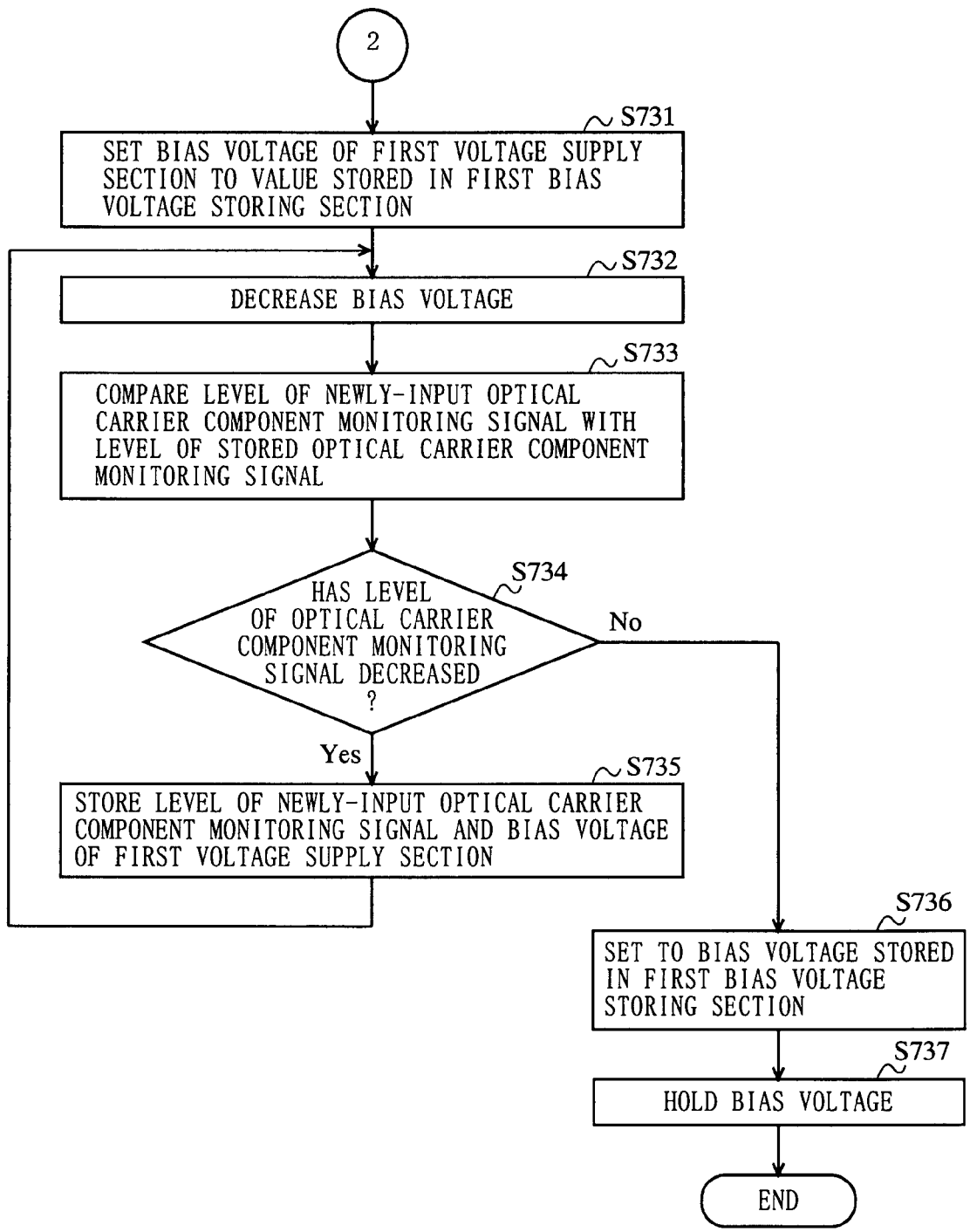
FIG. 10 is a flow chart showing an operation of the optical carrier component suppressing section 56 in a case where the level of the optical carrier component monitoring signal increases.

FIG. 10 is a flowchart showing the operation of the optical carrier component suppressing section 56 in a case where the first voltage control section 561 determines in step S714 that the level of the optical carrier component monitoring signal after the first bias voltage increase has increased (No in step S714). The first voltage control section 561 sets the first bias voltage value to the bias voltage value stored in the first bias voltage storing section 567 (step S731). The first voltage control section 561 decreases the first bias voltage by a predetermined voltage (step S732).

If an optical carrier component monitoring signal is newly inputted to the optical carrier component suppressing section 56 after the first voltage supply section 562 decreases the first bias voltage, the optical carrier component level comparing section 565 compares the level of the newly-inputted optical carrier component monitoring signal with the level of the optical carrier monitoring signal stored in the optical carrier component level storing section 566 (step S733). Based on the comparison result from the optical carrier component level comparing section 565, the first voltage control section 561 determines whether the level of the newly-inputted optical carrier component monitoring signal has decreased (step S734).

If it is determined in step S734 that the level of the optical carrier component monitoring signal has decreased, the first voltage control section 561 stores the level of the newly-inputted optical carrier component monitoring signal and the first bias voltage value in the optical carrier component level storing section 566 and the first bias voltage storing section 567, respectively (step S735), and the process returns to step S732.

If it is determined in step S734 that the level of the optical carrier component monitoring signal has increased, the first voltage control section 561 sets the bias voltage value stored in the first bias voltage storing section 567 as the first bias voltage value (step S736). The first voltage control section 561 holds the current value of the first bias voltage value (step S737), and the process ends.

By performing the process as shown in FIGS. 7 to 10, the optical carrier component suppressing section 56 controls the first bias voltage, which is applied to the first MZ interferometer 42 by the first bias voltage input terminal 8, to be such a bias voltage that the optical carrier component caused by a DC drift is best suppressed. Thus, the optical carrier component suppressing section 56 can suppress the optical carrier component contained in the optical signal outputted by the external optical modulator 4.

In the optical carrier component suppressing section 56, the first voltage control section 561 performs a process as described above for the second bias voltage input terminal 9 via the second voltage supply section 563. Thus, the optical carrier component suppressing section 56 controls the second bias voltage applied to the second MZ interferometer 43 to such a bias voltage that the optical carrier component caused by a DC drift is best suppressed. In such a case, the second bias voltage value is stored, together with the first bias voltage value, in the first bias voltage storing section 567. The process of controlling the bias voltage to be applied to the second MZ interferometer 43 is similar to that of controlling the bias voltage to be applied to the first MZ interferometer 42, and will not therefore be further described below.

The operation of the vestigial sideband component suppressing section 59 will be described. The vestigial sideband component suppressing section 59 is a circuit for controlling the third bias voltage to be applied to the third MZ interferometer 44 of the external optical modulator 4 in order to suppress the vestigial sideband component remaining in the optical signal outputted by the external optical modulator 4.

In a case where a vestigial sideband component is contained in the optical signal outputted by the external optical modulator 4, the photodetector section 52 produces a difference beat signal between a desired one sideband component and the remaining optical carrier component, and outputs the difference beat signal as the vestigial sideband component monitoring signal. The vestigial sideband component monitoring signal contains a component of the frequency $2 \times f_1$. FIG. 4(*b*) shows an exemplary spectrum of the vestigial sideband component monitoring signal. In a case where the point of operation of the first MZ interferometer 42 and that of the second MZ interferometer 43 are set so as to suppress the optical carrier component, the vestigial sideband component monitoring signal indicates that the optimal point of operation of the third MZ interferometer 44 has varied due to a DC drift. In such a case, the quality of the optical signal outputted by the external optical modulator 4 deteriorates.

In view of this, the vestigial sideband component suppressing section 59 adjusts the third bias voltage to be applied to the external optical modulator 4 so that the level of the vestigial sideband component monitoring signal is minimized when the level of the vestigial sideband component monitoring signal having a component of the frequency $2 \times f_1$ is greater than or equal to a predetermined reference value.

Figure 11:
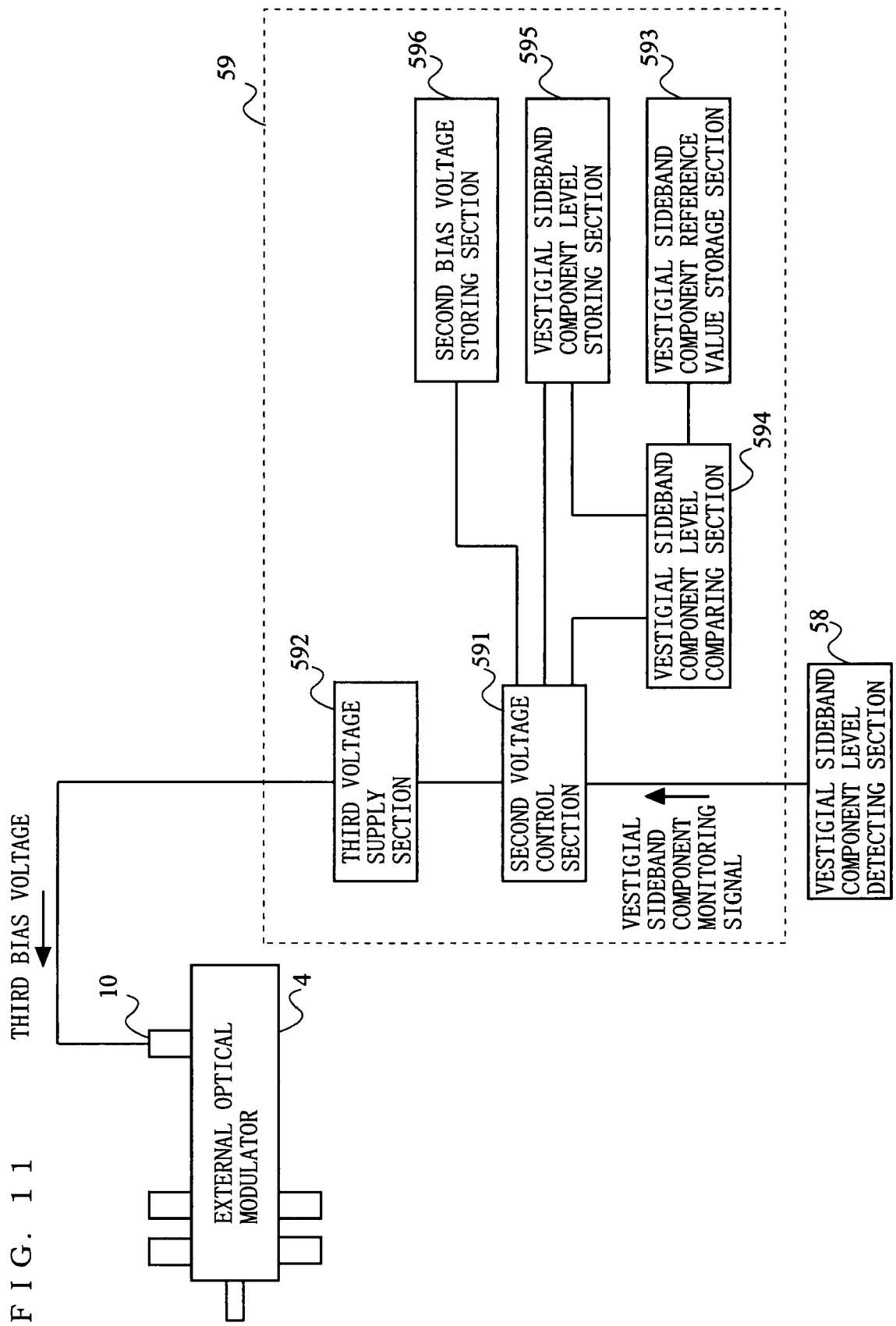
FIG. 11 is a block diagram showing a configuration of a vestigial sideband component suppressing section 59.

FIG. 11 is a block diagram showing a configuration of the vestigial sideband component suppressing section 59. The vestigial sideband component suppressing section 59 includes a second voltage control section 591, a third voltage supply section 592, a vestigial sideband component reference value storage section 593, a vestigial sideband component level comparing section 594, a vestigial sideband component level storing section 595, and a second bias voltage storing section 596.

The second voltage control section 591 controls the vestigial sideband component suppressing section 59. The third voltage supply section 592 supplies the third bias voltage to be inputted to the third bias voltage input terminal 10. The vestigial sideband component level comparing section 594 compares the level of the vestigial sideband component monitoring signal with the reference value stored in the vestigial sideband component reference value storage section 593. The vestigial sideband component reference value storage section 593 stores the reference value of the vestigial sideband component monitoring signal. The vestigial sideband component level storing section 595 stores the level of the vestigial sideband component monitoring signal. The second bias voltage storing section 596 stores the third bias voltage value.

Figure 12:
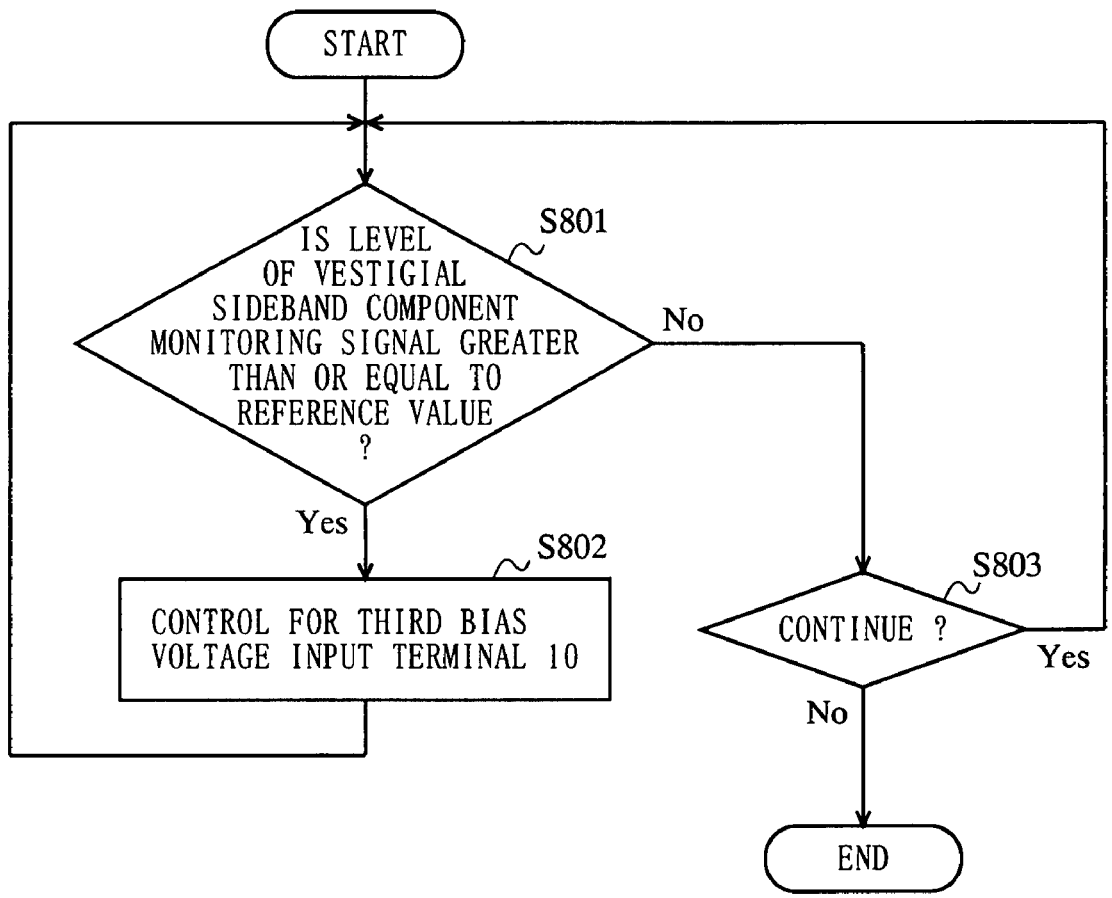
FIG. 12 is a flow chart showing a process performed by the vestigial sideband component suppressing section 59.

A process performed by the vestigial sideband component suppressing section 59 will be described with reference to FIGS. 12 to 15. FIG. 12 is a flow chart showing a process performed by the vestigial sideband component suppressing section 59. Referring to FIG. 12, when the vestigial sideband component monitoring signal of the frequency $2 \times f_1$ is inputted to the vestigial sideband component suppressing section 59, the vestigial sideband component level comparing section 594 compares the level of the vestigial sideband component monitoring signal with the reference value stored in the vestigial sideband component reference value storage section 593 (step S801).

If the level of the vestigial sideband component monitoring signal is greater than the reference value (Yes in step S801), the vestigial sideband component suppressing section 59 controls the third bias voltage (step S802). The vestigial sideband component suppressing section 59 returns to step S801. If the level of the vestigial sideband component monitoring signal is smaller than the reference value (No in step S801), the vestigial sideband component suppressing section 59 determines whether or not to continue the process of determining the level of the vestigial sideband component monitoring signal. If it is determined that the determination process is to be continued, the process returns to step S801. If the determination process is not to be continued, the optical carrier component suppressing section 56 exits the process. The vestigial sideband component suppressing section 59 may proceed to step S803 after performing the process of step S802.

Figure 13:
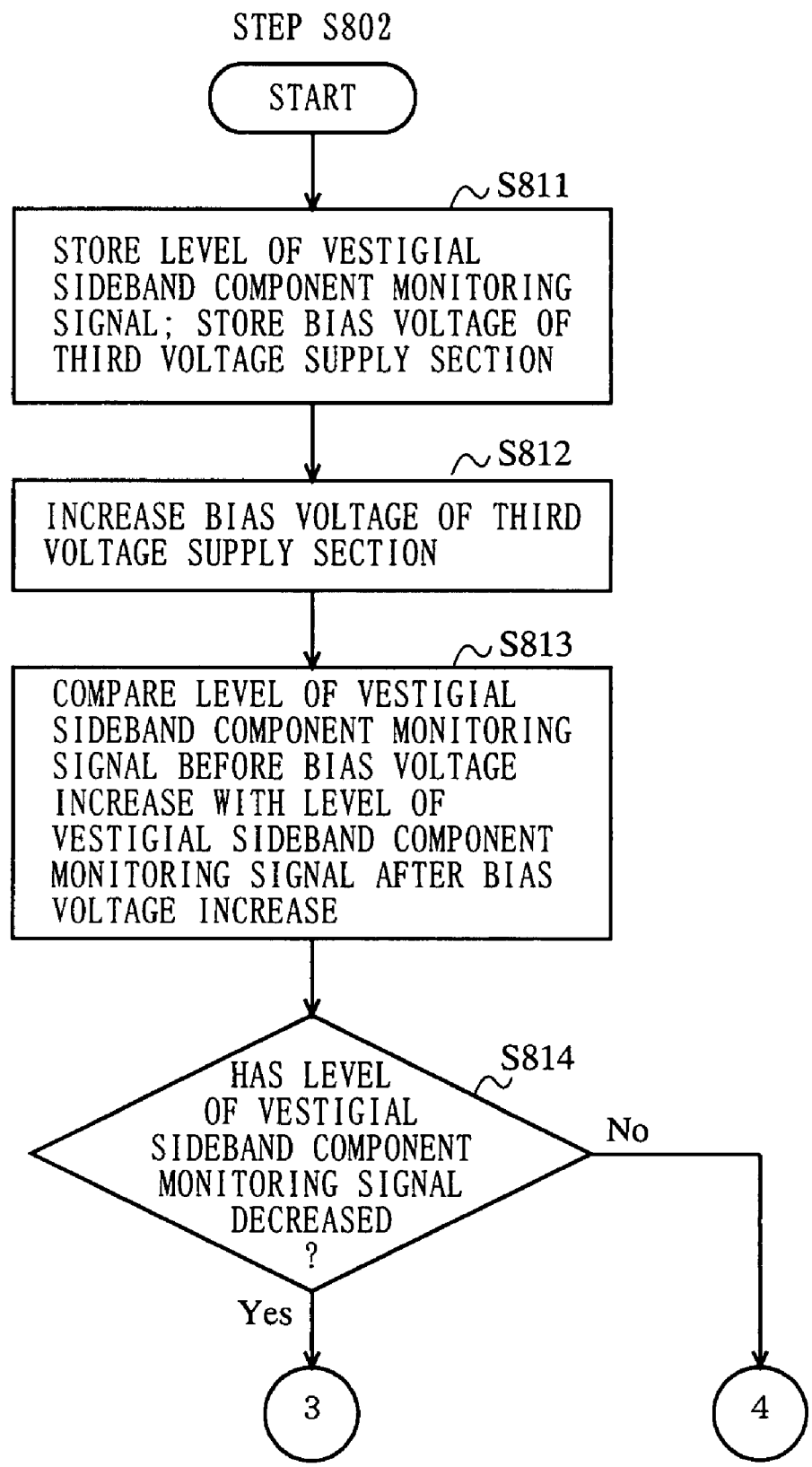
FIG. 13 is a flow chart showing in detail a process performed by the vestigial sideband component suppressing section 59 in step S802.

FIG. 13 is a flow chart showing in detail a process performed by the vestigial sideband component suppressing section 59 in step S802 shown in FIG. 12. In the vestigial sideband component suppressing section 59, the second voltage control section 591 stores the level of the inputted vestigial sideband component monitoring signal in the vestigial sideband component level storing section 595, and stores the third bias voltage value supplied by the third voltage supply section 592 in the second bias voltage storing section 596 (step S811). The second voltage control section 591 increases the third bias voltage by a predetermined voltage (step S812).

After performing the process of step S812, the vestigial sideband component monitoring signal after the third bias voltage increase is inputted to the vestigial sideband component suppressing section 59. The vestigial sideband component level comparing section 594 compares the level of the vestigial sideband component monitoring signal after the bias voltage increase and the level of the vestigial sideband component monitoring signal before the third bias voltage increase (step S813). Based on the comparison result from the vestigial sideband component level comparing section 594, the second voltage control section 591 determines whether the level of the vestigial sideband component monitoring signal after the third bias voltage increase has decreased (step S814).

Figure 14:
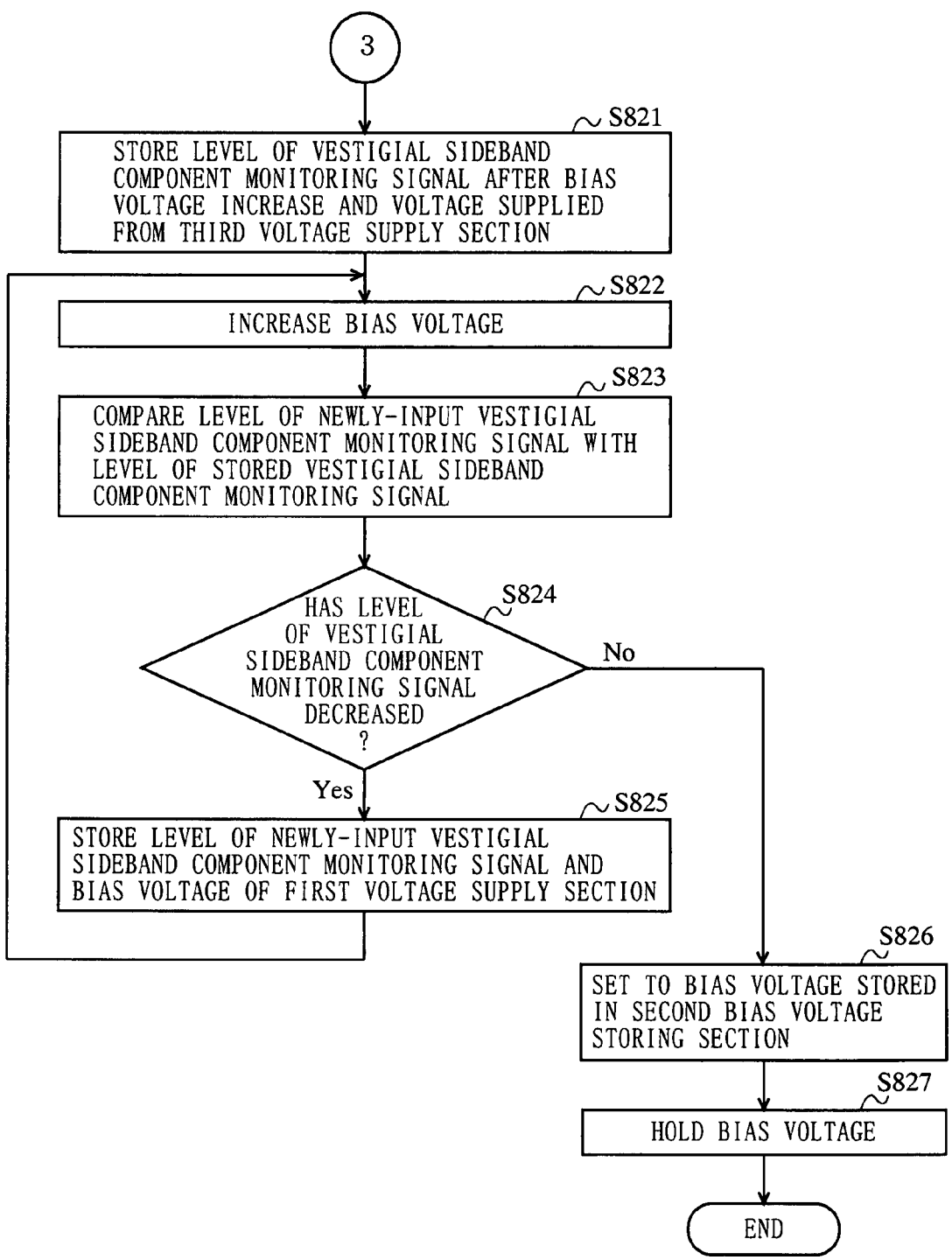
FIG. 14 is a flow chart showing an operation of the vestigial sideband component suppressing section 59 in a case where the level of the vestigial sideband component monitoring signal decreases.

FIG. 14 is a flow chart showing the operation of the vestigial sideband component suppressing section 59 in a case where the second voltage control section 591 determines in step S814 that the level of the vestigial sideband component monitoring signal after the bias voltage increase has decreased (Yes in step S814). The second voltage control section 591 stores the level of the vestigial sideband component monitoring signal after the third bias voltage increase and the third bias voltage value in the vestigial sideband component level storing section 595 and the second bias voltage storing section 596, respectively (step S821). The second voltage control section 591 further increases the third bias voltage by a predetermined voltage value (step S822).

If a vestigial sideband component monitoring signal is newly inputted to the vestigial sideband component suppressing section 59 after the third voltage supply section 592 further increases the third bias voltage, the vestigial sideband component level comparing section 594 compares the level of the newly-inputted vestigial sideband component monitoring signal with the level of the vestigial sideband component monitoring signal stored in the vestigial sideband component level storing section 595 (step S823). Based on the comparison result from the vestigial sideband component level comparing section 594, the second voltage control section 591 determines whether the level of the newly-inputted vestigial sideband component monitoring signal has decreased (step S824).

If it is determined in step S824 that the level of the vestigial sideband component monitoring signal has decreased, the second voltage control section 591 stores the level of the newly-inputted vestigial sideband component monitoring signal and the third bias voltage value in the vestigial sideband component level storing section 595 and the second bias voltage storing section 596, respectively (step S825), and the process returns to step S822.

If it is determined in step S824 that the level of the vestigial sideband component monitoring signal has increased, the second voltage control section 591 sets the third bias voltage to the bias voltage value stored in the second bias voltage storing section 596 (step S826). The second voltage control section 591 holds the current value of the third bias voltage value (step S827), and the process ends.

Figure 15:
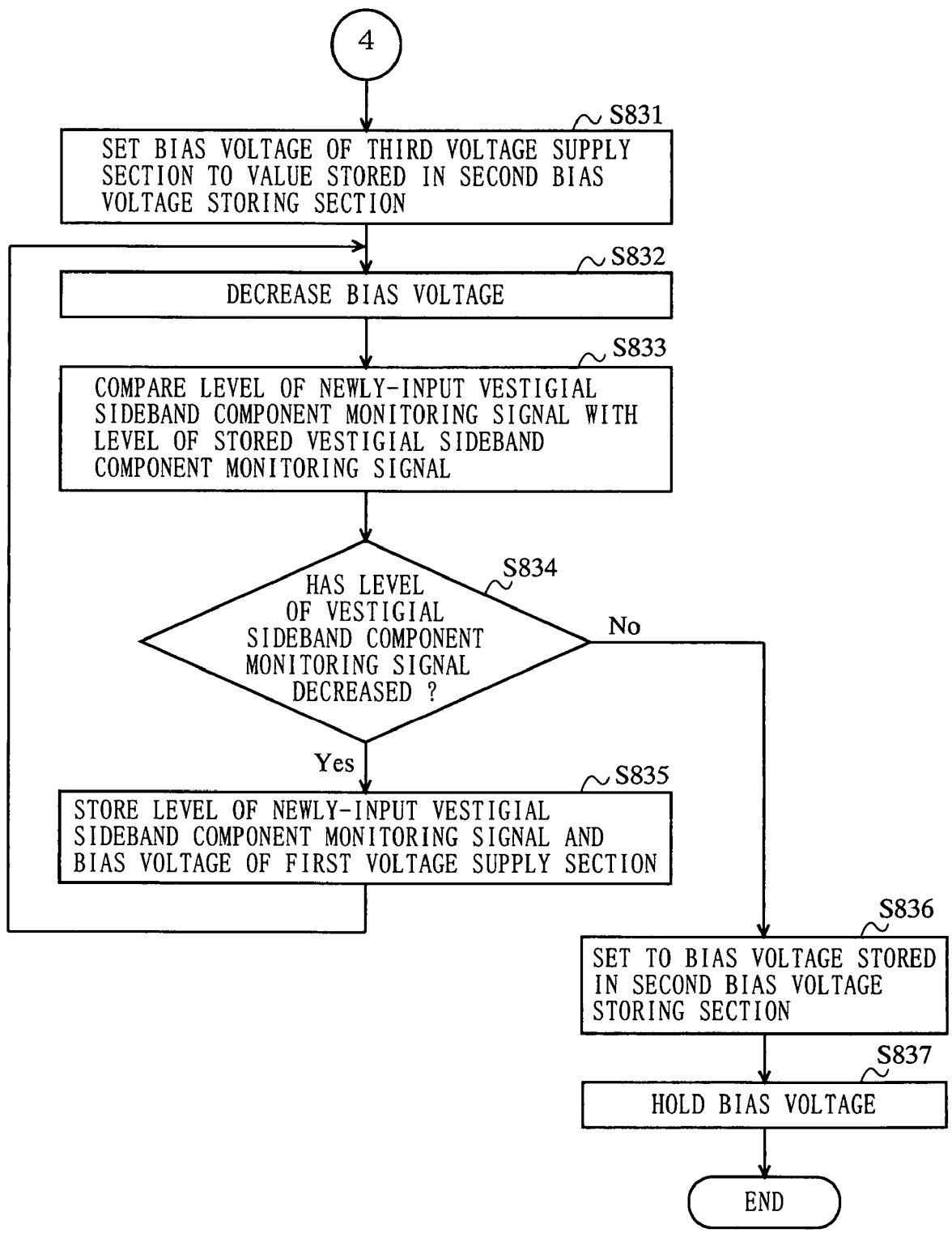
FIG. 15 is a flow chart showing an operation of the vestigial sideband component suppressing section 59 in a case where the level of the vestigial sideband component monitoring signal decreases.

FIG. 15 is a flow chart showing the operation of the vestigial sideband component suppressing section 59 in a case where the second voltage control section 591 determines in step S814 that the level of the vestigial sideband component monitoring signal after the bias voltage increase has increased (No in step S814). The second voltage control section 591 sets the third bias voltage value to the bias voltage value stored in the second bias voltage storing section 596 (step S831). The second voltage control section 591 decreases the third bias voltage by a predetermined voltage (step S832).

If a vestigial sideband component monitoring signal is newly inputted to the vestigial sideband component suppressing section 59 after the third voltage supply section 592 decreases the third bias voltage, the vestigial sideband component level comparing section 594 compares the level of the newly-inputted vestigial sideband component monitoring signal with the level of the vestigial sideband component monitoring signal stored in the vestigial sideband component level storing section 595 (step S833). Based on the comparison result from the vestigial sideband component level comparing section 594, the second voltage control section 591 determines whether the level of the newly-inputted vestigial sideband component monitoring signal has decreased (step S834).

If it is determined in step S834 that the level of the vestigial sideband component monitoring signal has decreased, the second voltage control section 591 stores the level of the newly-inputted vestigial sideband component monitoring signal and the third bias voltage value in the vestigial sideband component level storing section 595 and the second bias voltage storing section 596, respectively (step S835), and the process returns to step S832.

If it is determined in step S834 that the level of the vestigial sideband component monitoring signal has increased, the second voltage control section 591 sets the bias voltage value stored in the second bias voltage storing section 596 as the third bias voltage value (step S836). The second voltage control section 591 holds the current value of the third bias voltage value (step S837), and the process ends.

By performing the process as shown in FIGS. 12 to 15, the vestigial sideband component suppressing section 59 controls the third bias voltage, which is applied to the third MZ interferometer 44, to be such a bias voltage that the vestigial sideband component caused by a DC drift is best suppressed. Thus, the vestigial sideband component suppressing section 59 can suppress the vestigial sideband component contained in the optical signal outputted by the external optical modulator 4.

Thus, with the optical transmission device of the first embodiment, a single-sideband suppressed-carrier MZ external optical modulator including at least three MZ interferometers outputs an optical signal containing an optical carrier component and a vestigial sideband component based on variations in the bias voltage due to a DC drift in each MZ interferometer. The optical transmission device of the present embodiment extracts the optical carrier component and the vestigial sideband component contained in the optical signal outputted from the single-sideband suppressed-carrier MZ external optical modulator, and determines the bias voltage to be applied to the single-sideband suppressed-carrier MZ external optical modulator based on level of the optical carrier component and that of the vestigial sideband component, whereby it is possible to suppress the optical carrier component and the vestigial sideband component contained in the optical signal.

The first RF input terminal 6 and the first bias voltage input terminal 8 may be the same terminal. The second RF input terminal 7 and the second bias voltage input terminal 9 may be the same terminal.

Figure 16:
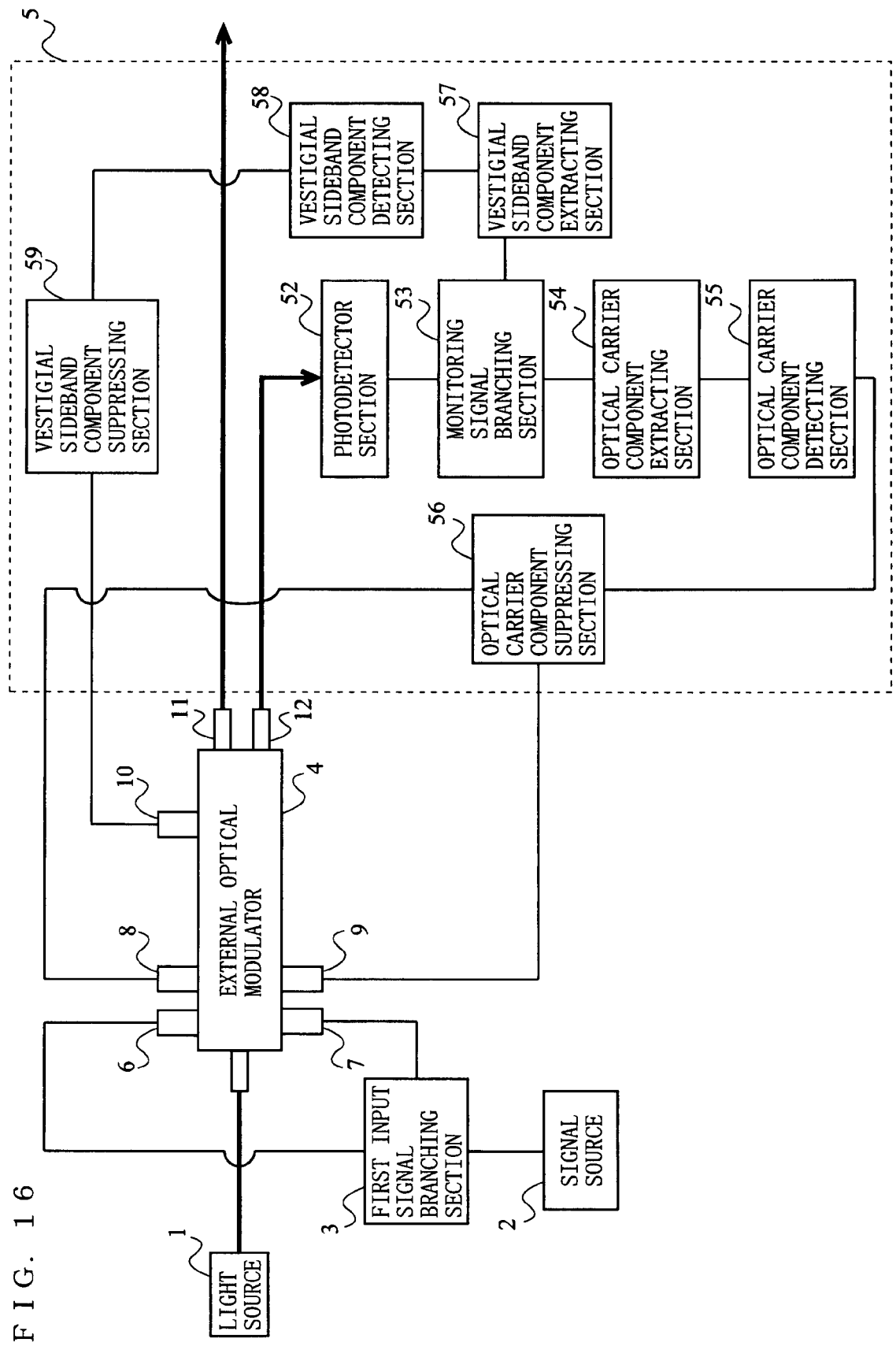
FIG. 16 shows the external optical modulator 4 including a first port 11 and a second port 12.

The external optical modulator 4 may include a first port 11 and a second port 12 for outputting an optical signal as shown in FIG. 16. In such a case, the optical signal outputted from the first port 11 is transmitted through an optical transmission path (not shown). The optical signal outputted from the second port 12 is inputted directly to the photodetector section 52. By using the external optical modulator 4 as shown in FIG. 16, it is possible to omit the light branching section 51 of the modulator operation controlling section 5.

In a case where the external optical modulator 4 shown in FIG. 16 is used, the third MZ interferometer 44 may include the directional coupler 446 instead of the third optical coupler section 445 as shown in FIG. 17. In the third MZ interferometer 44, the two optical phase-modulated signals propagating through the fifth optical waveguide 441 and the sixth optical waveguide 443 are combined together and interfere with each other in the directional coupler 446 to be thereby converted to a third optically-modulated signal. The third optically-modulated signal is branched and outputted from the first port 11 and the second port 12.

Second Embodiment

Figure 18:
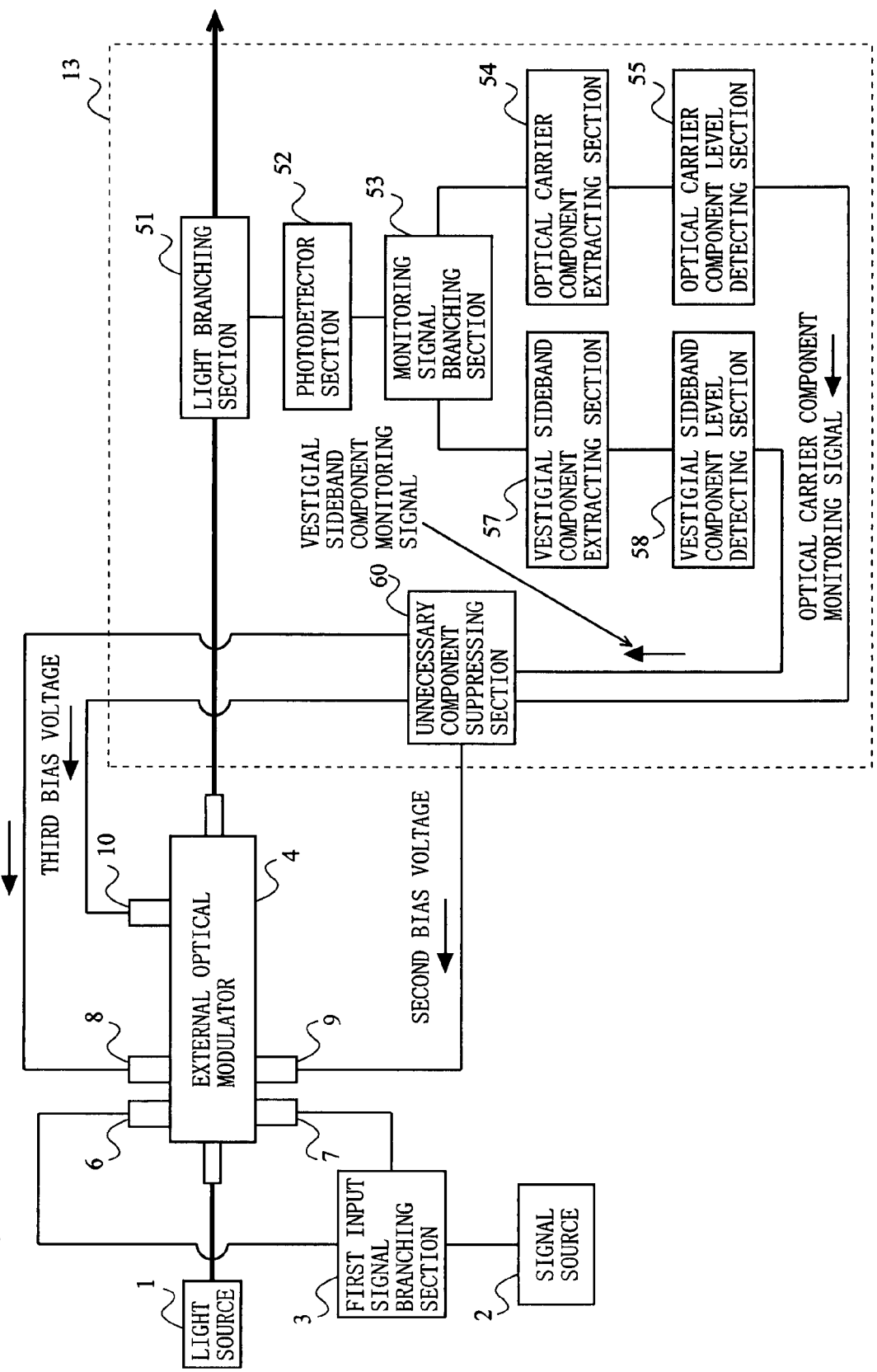
FIG. 18 is a block diagram showing a configuration of an optical transmission device according to a second embodiment of the present invention.

FIG. 18 is a block diagram showing a configuration of an optical transmission device according to a second embodiment of the present invention. Like elements to those of the first embodiment are denoted by like reference numerals and will not be further described below.

Referring to FIG. 18, the optical transmission device of the second embodiment includes the light source 1, the signal source 2, the first input signal branching section 3, the external optical modulator 4, a modulator operation controlling section 13, the first RF input terminal 6, the second input terminal 7, the first bias voltage input terminal 8, the second bias voltage input terminal 9, and the third bias voltage input terminal 10.

As can be seen from FIG. 18, the optical transmission device of the second embodiment of the present invention includes the modulator operation controlling section 13 instead of the modulator operation controlling section 5 of the optical transmission device of the first embodiment. The optical transmission device of the second embodiment will now be described while focusing on the modulator operation controlling section 13.

As shown in FIG. 18, the modulator operation controlling section 13 includes the light branching section 51, the photodetector section 52, the monitoring signal branching section 53, the optical carrier component extracting section 54, the optical carrier component level detecting section 55, the vestigial sideband component extracting section 57, the vestigial sideband component level detecting section 58, and an unnecessary component suppressing section 60.

In the modulator operation controlling section 13, the operations of the light branching section 51, the photodetector section 52, the monitoring signal branching section 53, the optical carrier component extracting section 54, the optical carrier component level detecting section 55, the vestigial sideband component extracting section 57 and the vestigial sideband component level detecting section 58 are similar to those of the optical transmission device of the first embodiment. The unnecessary component suppressing section 60 controls the bias voltage to be applied to the external optical modulator 4 in order to suppress the optical carrier component and the vestigial sideband component contained in the optical signal outputted by the external optical modulator 4.

Figure 19:
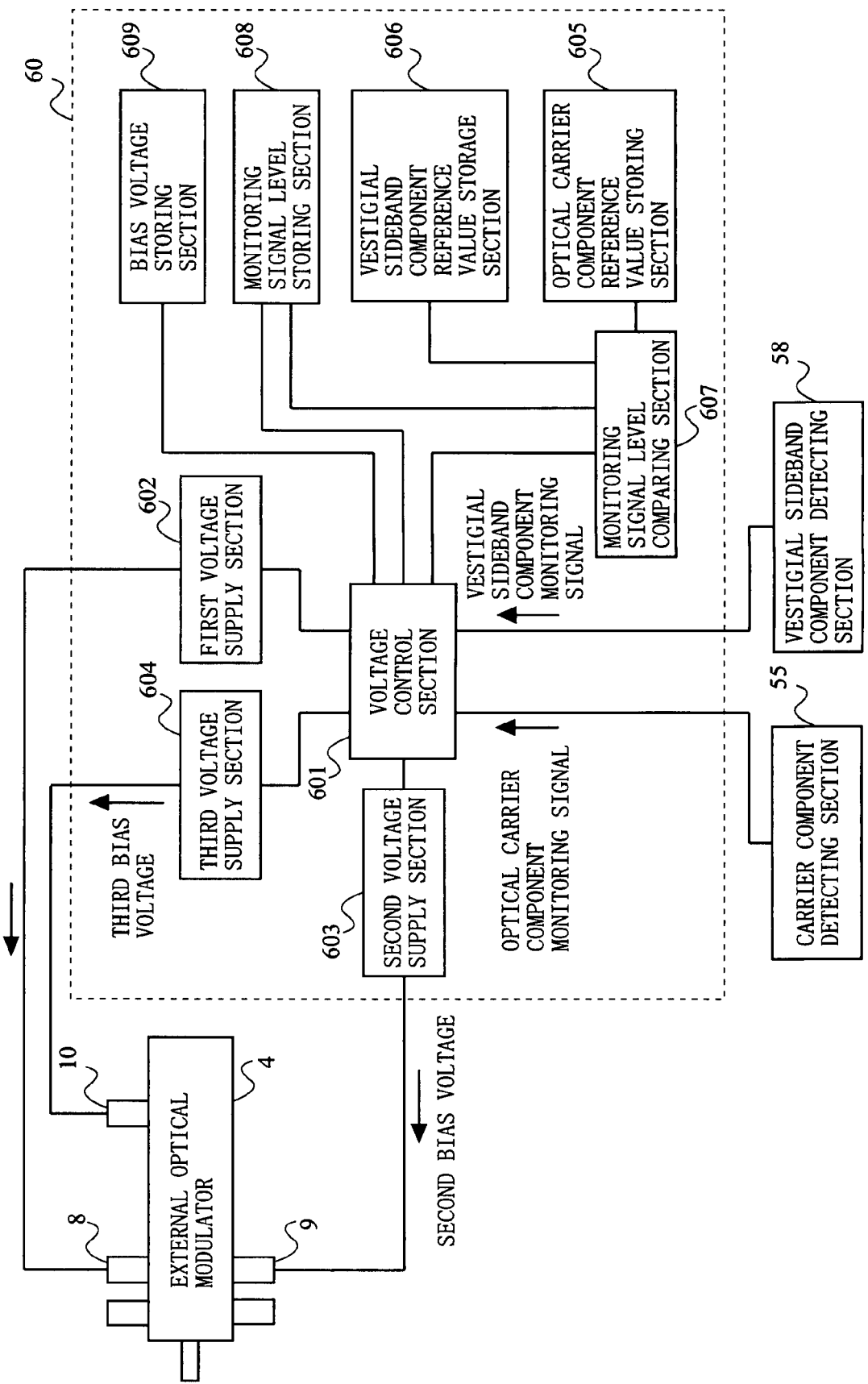
FIG. 19 is a block diagram showing a detailed configuration of an unnecessary component suppressing section 60.

FIG. 19 is a block diagram showing in detail a configuration of the unnecessary component suppressing section 60. Referring to FIG. 19, the unnecessary component suppressing section 60 includes a voltage control section 601, a first voltage supply section 602, a second voltage supply section 603, a third voltage supply section 604, an optical carrier component reference value storing section 605, a vestigial sideband component reference value storage section 606, a monitoring signal level comparing section 607, a monitoring signal level storing section 608, and a bias voltage storing section 609.

The voltage control section 601 controls the unnecessary component suppressing section 60. The first voltage supply section 602 supplies the first bias voltage to be inputted to the first bias voltage input terminal 8. The second voltage supply section 603 supplies the second bias voltage to be inputted to the second bias voltage input terminal 9. The third voltage supply section 604 supplies the third bias voltage to be inputted to the third bias voltage input terminal 10.

The optical carrier component reference value storing section 605 stores the reference value of the optical carrier component monitoring signal. The vestigial sideband component reference value storage section 606 stores the reference value of the vestigial sideband component monitoring signal. The monitoring signal level comparing section 607 compares the level of the inputted optical carrier component monitoring signal with the reference value stored in the optical carrier component reference value storing section 605, and compares the level of the inputted vestigial sideband component monitoring signal with the reference value stored in the vestigial sideband component reference value storage section 606. The monitoring signal level comparing section 607 compares the level of the optical carrier component monitoring signal stored in the monitoring signal level storing section 608 with the level of the newly-inputted optical carrier monitoring signal. The monitoring signal level comparing section 607 compares the level of the vestigial sideband component monitoring signal stored in the monitoring signal level storing section 608 with the level of the newly-inputted vestigial sideband component monitoring signal.

The monitoring signal level storing section 608 stores the level of the optical carrier component monitoring signal and that of the vestigial sideband component monitoring signal. The bias voltage storing section 609 stores the first bias voltage value to be applied to the first bias voltage input terminal 8, the second bias voltage value to be applied to the second bias voltage input terminal 9, and the third bias voltage value to be applied to the third bias voltage input terminal 10.

Figure 20:
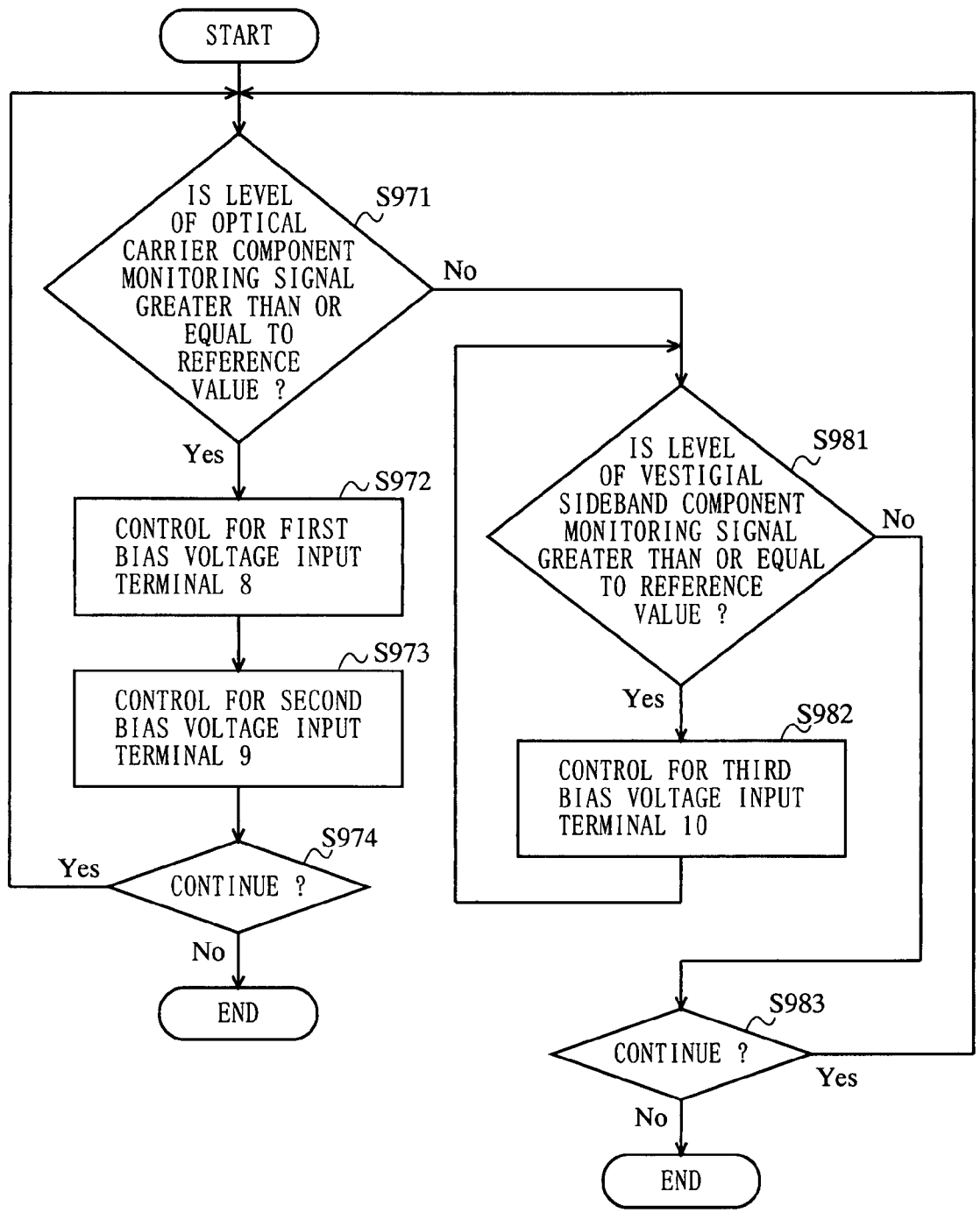
FIG. 20 is a flowchart showing a process performed by the unnecessary component suppressing section 60.

FIG. 20 is a flow chart showing a process performed by the unnecessary component suppressing section 60. Referring to FIG. 20, the voltage control section 601 determines whether the optical carrier component monitoring signal of the frequency $f_1$ has been inputted at a level greater than a predetermined reference value (step S971). Specifically, the monitoring signal level comparing section 607 determines whether the level of the optical carrier component monitoring signal is greater than the reference value stored in the optical carrier component reference value storing section 605.

If the level of the optical carrier component monitoring signal is greater than the reference value, the voltage control section 601 controls the first bias voltage to be inputted to the first bias voltage input terminal 8 (step S972). Then, the voltage control section 601 controls the second bias voltage to be inputted to the second bias voltage input terminal 9 (step S973). If the level of the optical carrier component monitoring signal is smaller than the reference value, the voltage control section 601 directly proceeds to step S974. The voltage control section 601 determines whether or not to continue the bias voltage control of the external optical modulator 4 (step S974). If the control is to be continued, the process returns to step S971. Otherwise, the process ends.

If it is determined in step S971 that the level of the optical carrier component monitoring signal is less than or equal to the reference value, the voltage control section 601 determines whether the level of the vestigial sideband component monitoring signal of the frequency $2 \times f_1$ is greater than a predetermined reference value (step S981). Specifically, the monitoring signal level comparing section 607 determines whether the level of the vestigial sideband component monitoring signal is greater than the reference value stored in the vestigial sideband component reference value storage section 606. If it is determined in step S981 that the level of the vestigial sideband component monitoring signal is greater than the reference value, the voltage control section 601 controls the third bias voltage inputted to the third bias voltage input terminal 10 (step S982). If the level of the vestigial sideband component monitoring signal is smaller than the reference value, the voltage control section 601 directly proceeds to step S983. The voltage control section 601 determines whether or not to continue the bias voltage control of the external optical modulator 4 (step S983). If the control is to be continued, the process returns to step S971. Otherwise, the process ends. The voltage control section 601 may perform the process of step S983 after performing the process of step S982.

The process of controlling the bias voltage to be applied to each bias voltage input terminal is similar to that of the first embodiment, and will not therefore be further described below.

Thus, with the optical transmission device of the second embodiment, a single-sideband suppressed-carrier MZ external optical modulator including at least three MZ interferometers outputs an optical signal containing an optical carrier component and a vestigial sideband component based on variations in the bias voltage due to a DC drift in each MZ interferometer. The optical transmission device of the present embodiment extracts the optical carrier component and the vestigial sideband component from the optical signal outputted from the single-sideband suppressed-carrier MZ external optical modulator, and determines the bias voltage to be applied to the single-sideband suppressed-carrier MZ external optical modulator based on the level of the optical carrier component and that of the vestigial sideband component, whereby it is possible to suppress the optical carrier component and the vestigial sideband component contained in the optical signal. Moreover, the optical transmission device of the second embodiment defines the order for controlling the bias voltage to be applied to the single-sideband suppressed-carrier MZ optical modulator, whereby it is possible to realize a more efficient bias voltage optimization. Thus, the optical transmission device of the second embodiment is capable of suppressing the optical carrier component and the vestigial sideband component in a shorter amount of time than the optical transmission device of the first embodiment.

The reference values stored in the optical carrier component reference value storing section 605 and the vestigial sideband component reference value storage section 606 may be the same value. In such a case, the optical carrier component reference value storing section 605 and the vestigial sideband component reference value storage section 606 may be a single storage section. This allows a reduction in the size of the optical transmission device.

Figure 21:
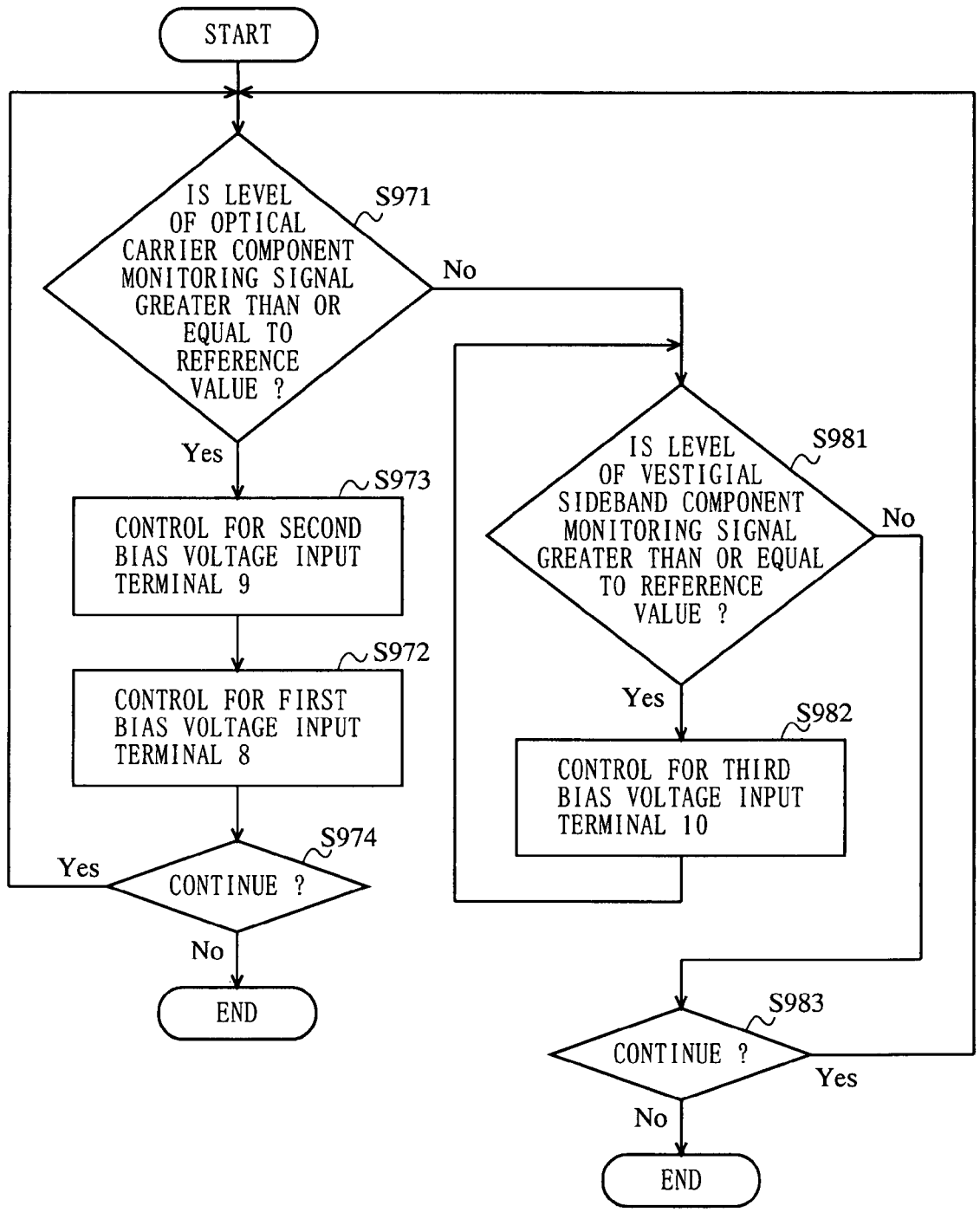
FIG. 21 is a flowchart showing a process performed by the unnecessary component suppressing section 60.
Figure 22:
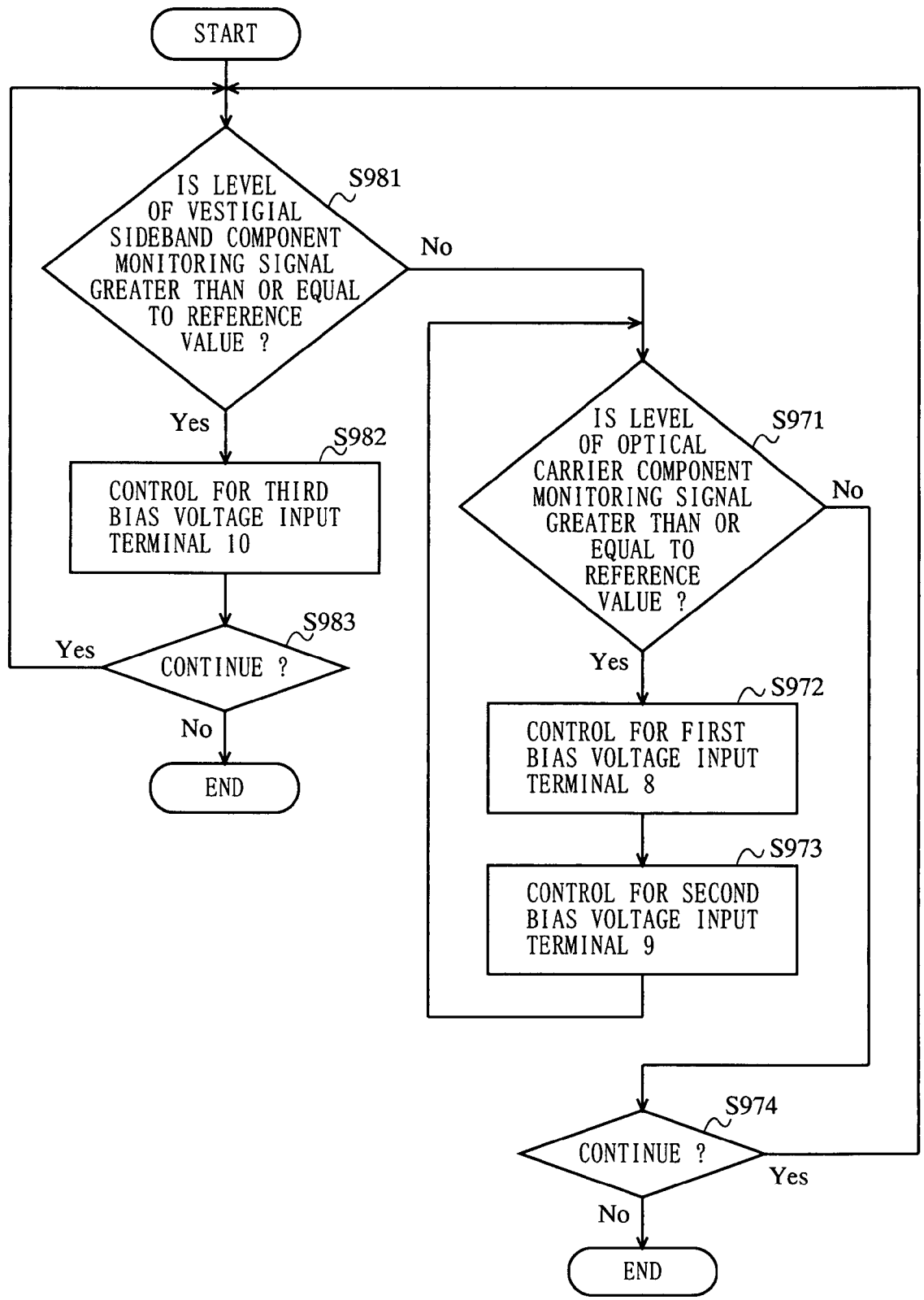
FIG. 22 is a flow chart showing a case where the unnecessary component suppressing section 60 first performs a process of suppressing the vestigial sideband component.
Figure 23:
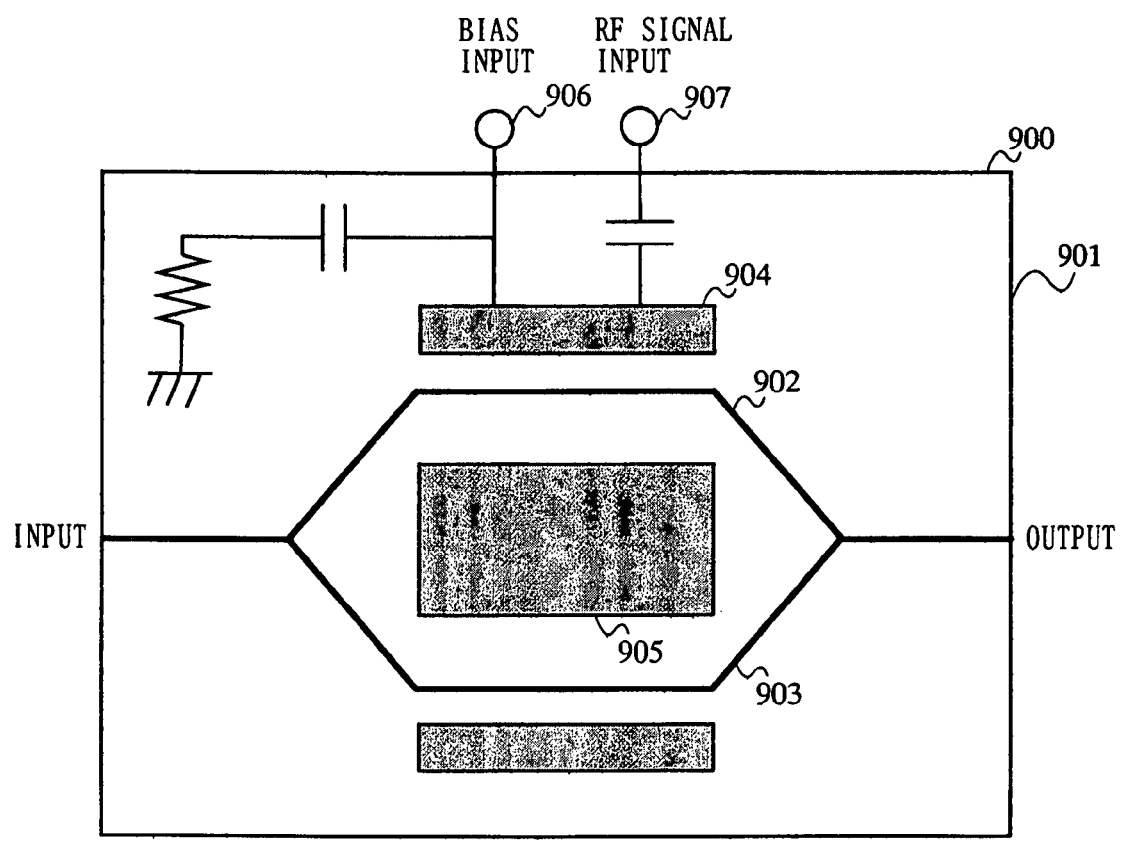
FIG. 23 shows a typical configuration of an MZ optical modulator.
Figure 24:
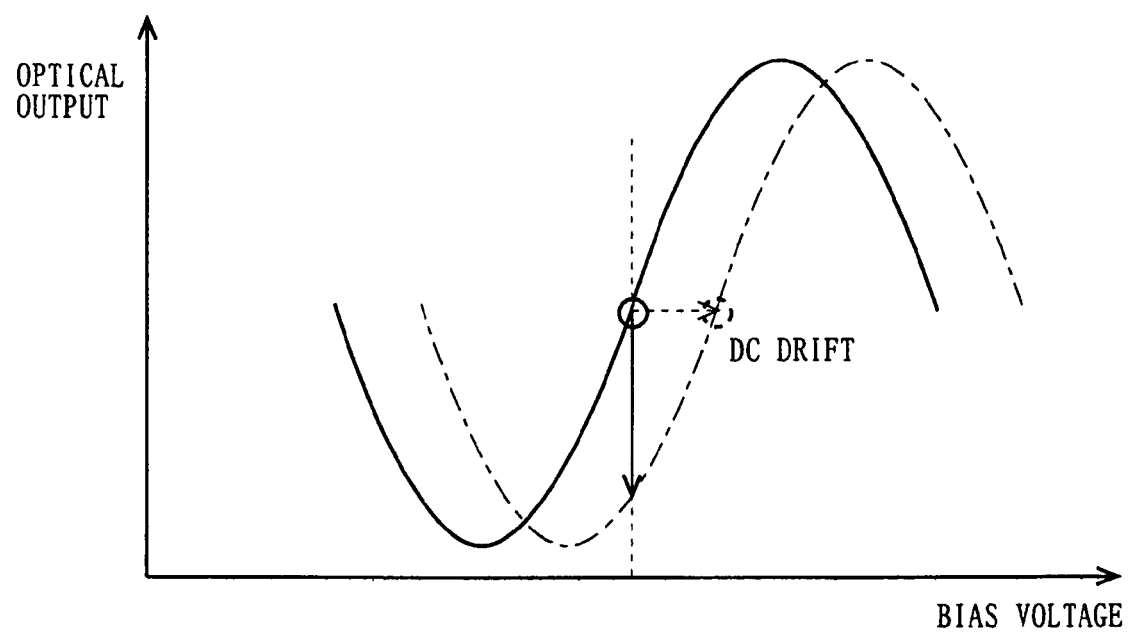
FIG. 24 is a diagram illustrating a DC drift occurring in an MZ type modulator.
Figure 25:
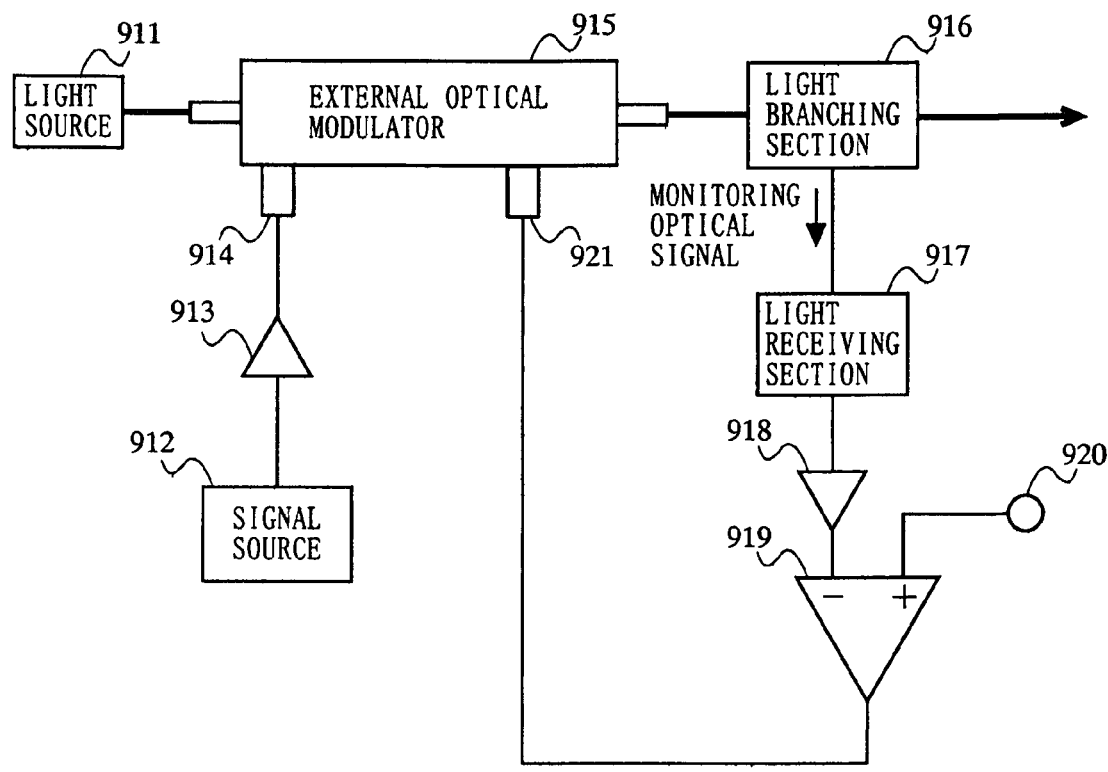
FIG. 25 shows a configuration of a conventional optical transmission device described in Patent Document 1.
Figure 26:
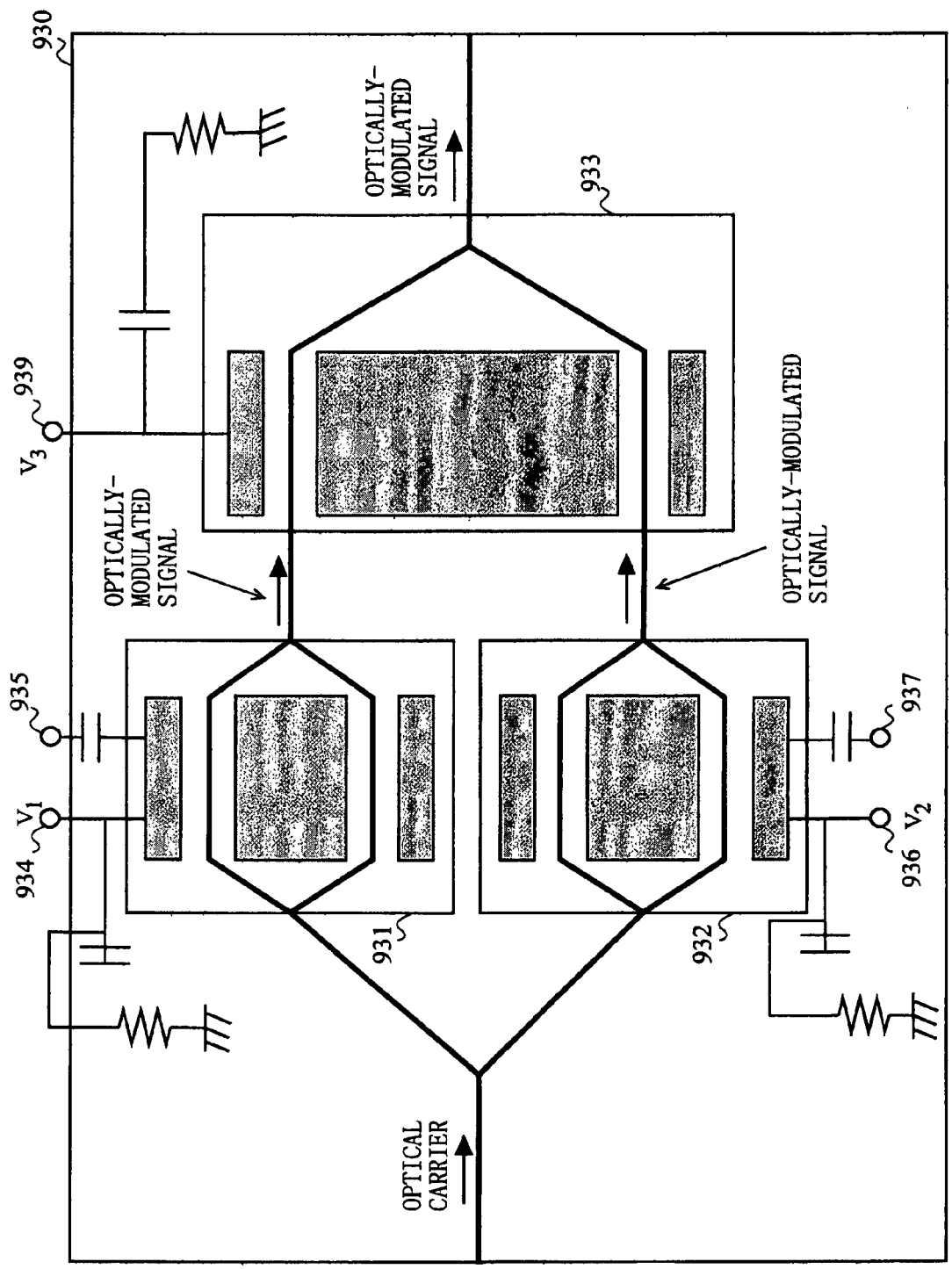
FIG. 26 is a schematic diagram showing a configuration of an SSB-SC optical modulator.
Figure 27:
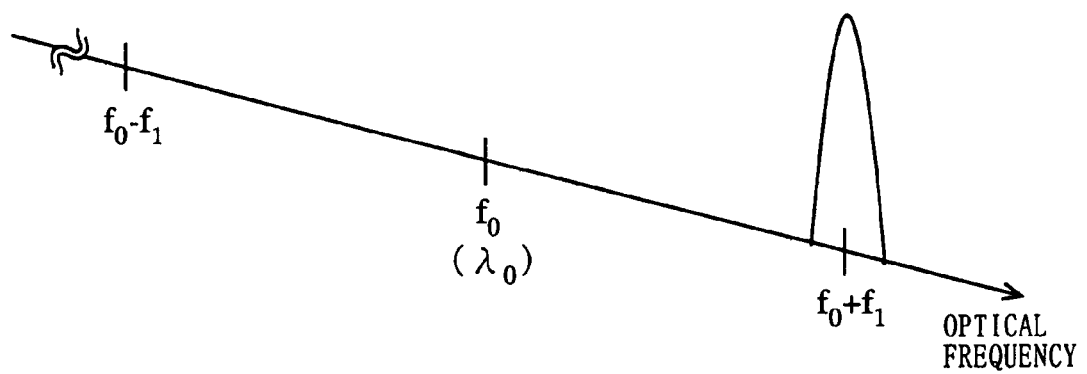
FIG. 27 is a schematic diagram showing a spectrum of an optical signal 943 outputted from an SSB-SC optical modulator.
Figure 28:
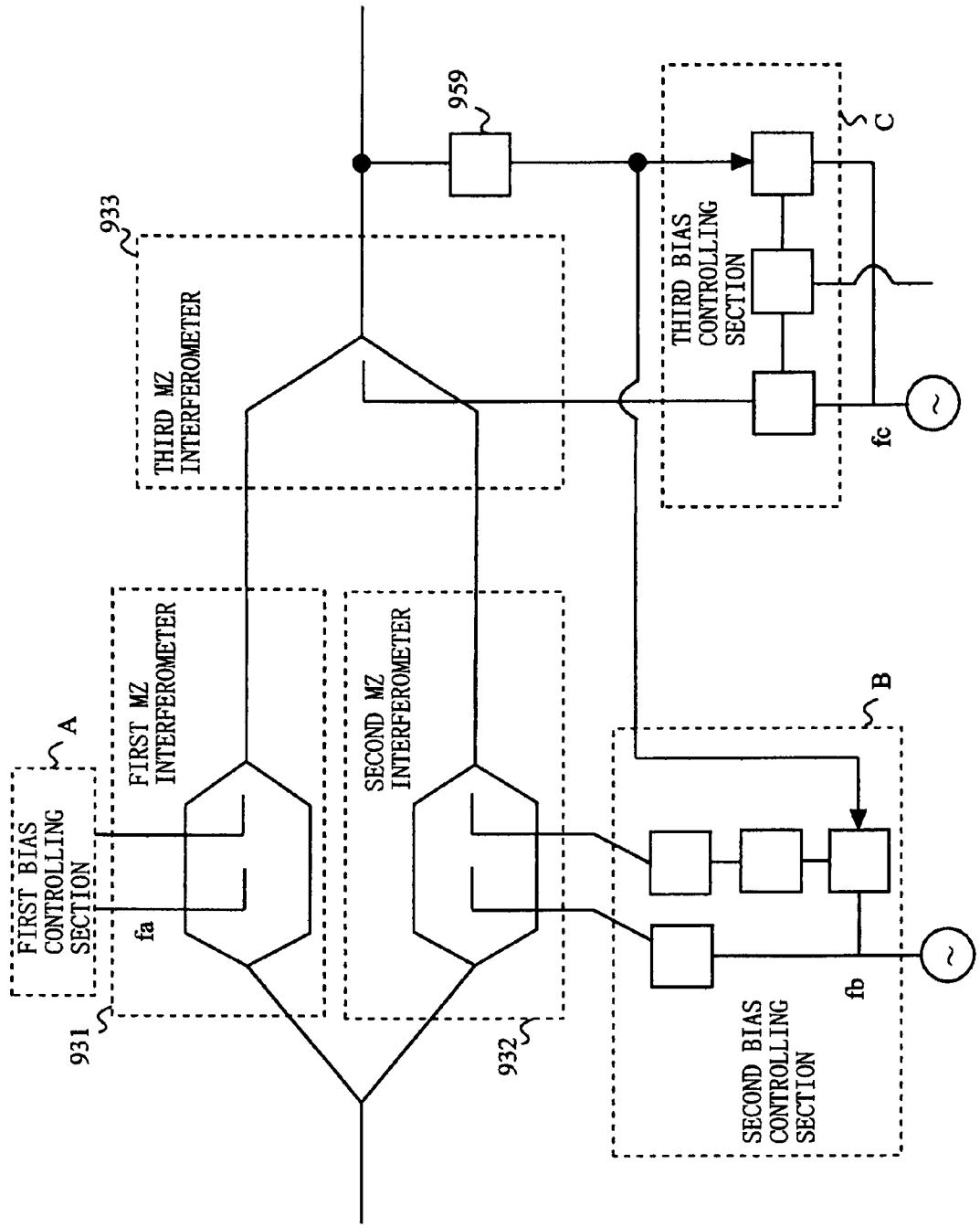
FIG. 28 shows a configuration of a conventional optical transmission device described in Patent Document 2.
Figure 29:
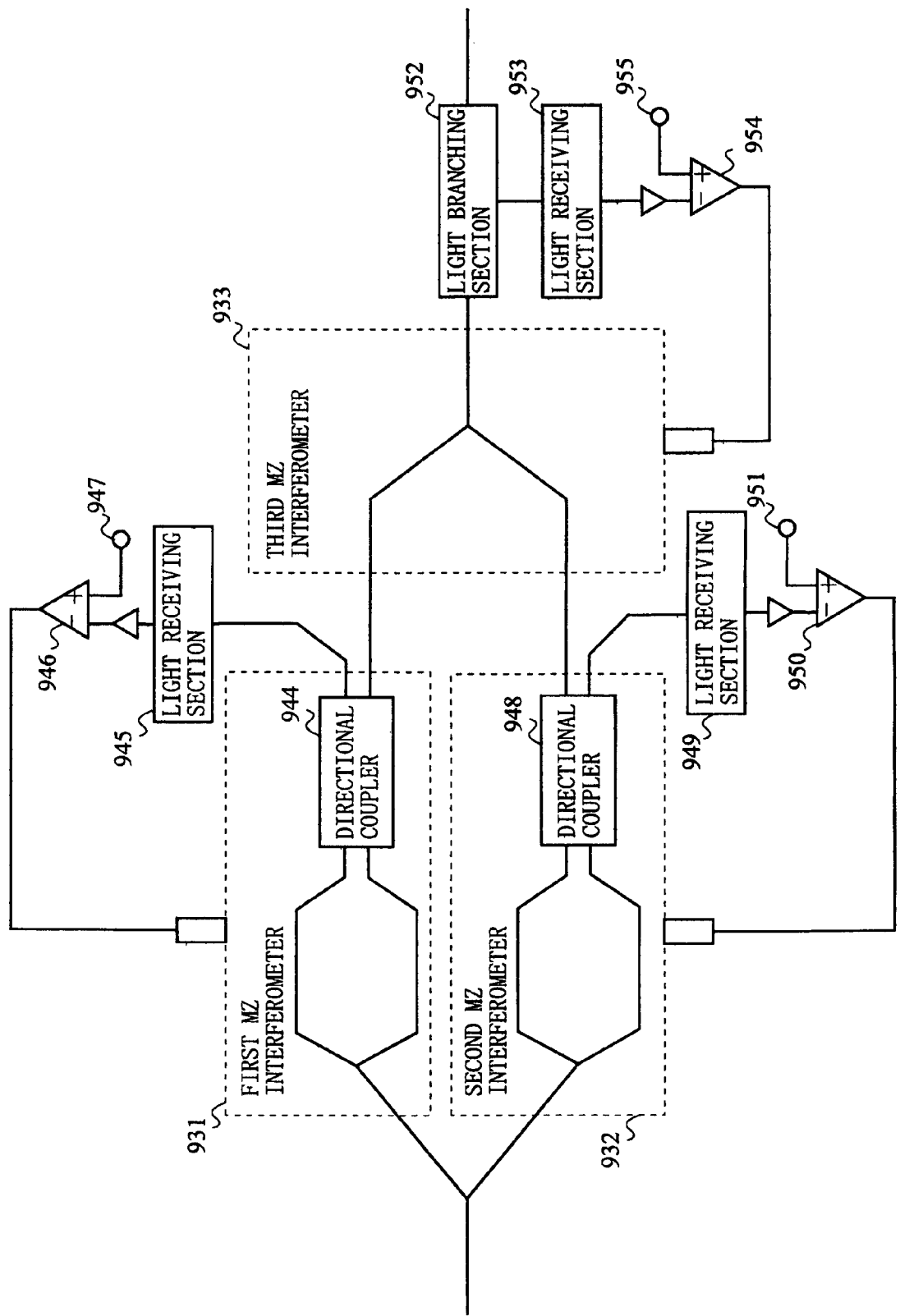
FIG. 29 shows a case where the configuration described in Patent Document 1 is applied to each of the MZ interferometers together forming the SSB-SC optical modulator.

With the unnecessary component suppressing section 60, steps S972 and S973 may be switched around as shown in FIG. 21, instead of the flow chart shown in FIG. 20. The process of suppressing the vestigial sideband component may be performed first as shown in FIG. 22. However, the unnecessary component suppressing section 60 preferably performs the flow chart shown in FIG. 20 or 21. This is because the optical carrier component and the vestigial sideband component can be suppressed more efficiently if the process of controlling the bias voltage for suppressing the optical carrier component is performed first and then the process of controlling the bias voltage for suppressing the vestigial sideband component is performed.

In the optical transmission devices of the first and second embodiments, the external optical modulator 4 includes three MZ interferometers. Alternatively, the external optical modulator 4 may include four or more MZ interferometers. The optical transmission devices of the first and second embodiments separately detect the level of the optical carrier component and that of the unnecessary one sideband component outputted from the external optical modulator 4 to determine the bias voltage to be applied to each MZ interferometer. By controlling the MZ interferometer bias voltage in this way, it is possible to suppress the optical carrier component and the unnecessary one sideband component of the optical signal outputted by the external optical modulator including four or more MZ interferometers.

INDUSTRIAL APPLICABILITY

The optical transmission device of the present invention is capable of suppressing the optical carrier component and the vestigial sideband component contained in the optical signal outputted by the external optical modulator including a plurality of Mach-Zehnder interferometers. The optical transmission device includes the external optical modulator including a plurality of Mach-Zehnder interferometers, and is useful as an optical transmission device for outputting a single-sideband optical intensity-modulated signal with suppressed optical carrier component.

The invention claimed is:

1. An optical transmission device for outputting a single-sideband optical intensity-modulated signal with suppressed optical carrier component, the optical transmission device comprising:

first and second Mach-Zehnder interferometers each for receiving one of two optical signals obtained by branching an optical carrier having a frequency $f_0$ outputted from a light source and outputting a phase-modulated signal obtained by modulating a phase of the input optical signal with an inputted electrical signal having a frequency $f_1$;

a third Mach-Zehnder interferometer for further phase-modulating and combining together the two phase-modulated signals outputted from the first and second Mach-Zehnder interferometers, respectively;

a light branching section for branching the optical intensity-modulated signal into an optical signal transmitted along an optical transmission path and a monitoring optical signal;

a photodetector section for converting the monitoring optical signal to an electric signal and outputting the electric signal as a monitoring signal;

a branching section for branching the monitoring signal into two signals;

an optical carrier component extracting section for passing therethrough only a signal component of one of the branched monitoring signals that is in a vicinity of the frequency $f_1$;

an optical carrier component level detecting section for detecting a level of the signal outputted by the optical carrier component level extracting section to output an optical carrier component monitoring signal according to the detected level;

a vestigial sideband component extracting section for passing therethrough only a signal component of the other one of the branched monitoring signals that is in a vicinity of a frequency $2 \times f_1$;

a vestigial sideband component level detecting section for detecting a level of the signal outputted by the vestigial sideband component level extracting section to output a vestigial sideband component monitoring signal according to the detected level;

an optical carrier component suppressing section for suppressing an optical carrier component of the optical intensity-modulated signal by controlling bias voltages to be applied to the first and second Mach-Zehnder interferometers and causing a level of the optical carrier component monitoring signal to be less than or equal to a reference value; and a vestigial sideband component suppressing section for suppressing an unnecessary one sideband component of the optical intensity-modulated signal by controlling a bias voltage to be applied to the third Mach-Zehnder interferometer and causing a level of the vestigial sideband component monitoring signal to be less than or equal to a reference value.

2. The optical transmission device according to claim 1, wherein:

the optical carrier component suppressing section comprises:

a first bias voltage supply section for supplying a bias voltage to be applied to the first Mach-Zehnder interferometer;

a second bias voltage supply section for supplying a bias voltage to be applied to the second Mach-Zehnder interferometer;

an optical carrier component reference value storing section for storing the reference value for the level of the optical carrier component monitoring signal;

an optical carrier component level storing section for storing a level of the inputted optical carrier component monitoring signal;

a first bias voltage storing section for storing the bias voltages supplied by the first and second voltage supply sections;

an optical carrier component level comparing section for comparing a level of the newly-inputted optical carrier component monitoring signal with the reference value stored in the optical carrier component reference value storing section, and for comparing the level of the newly-inputted optical carrier component monitoring signal with the level of the optical carrier component monitoring signal stored in the optical carrier component level storing section; and a first voltage control section for controlling bias voltages to be applied to the first and second Mach-Zehnder interferometers based on a comparison result from the optical carrier component level comparing section; and the vestigial sideband component detecting section comprises:

a third bias voltage supply section for supplying a bias voltage to be applied to the third Mach-Zehnder interferometer;

a vestigial sideband component reference value storage section for storing the reference value for the level of the vestigial sideband component monitoring signal;

a vestigial sideband component level storing section for storing a level of the inputted vestigial sideband component monitoring signal;

a third bias voltage storing section for storing the bias voltage supplied by the third voltage supply section;

a vestigial sideband component level comparing section for comparing a level of the newly-inputted vestigial sideband component monitoring signal with the reference value stored in the vestigial sideband component reference value storage section, and for comparing the level of the newly-inputted vestigial sideband component monitoring signal with the level of the vestigial sideband component monitoring signal stored in the vestigial sideband component level storing section; and a second voltage control section for controlling a bias voltage to be applied to the third Mach-Zehnder interferometer based on a comparison result from the vestigial sideband component level comparing section.

3. An optical transmission device for outputting a single-sideband optical intensity-modulated signal with suppressed optical carrier component, the optical transmission device comprising:

first and second Mach-Zehnder interferometers each for receiving one of two optical signals obtained by branching an optical carrier having a frequency $f_0$ outputted from a light source and outputting a phase-modulated signal obtained by modulating a phase of the input optical signal with an inputted electrical signal having a frequency $f_1$;

a third Mach-Zehnder interferometer for further phase-modulating and combining together the two phase-modulated signals outputted from the first and second Mach-Zehnder interferometers, respectively;

a light branching section for branching the optical intensity-modulated signal into an optical signal transmitted along an optical transmission path and a monitoring optical signal;

a photodetector section for converting the monitoring optical signal to an electric signal and outputting the electric signal as a monitoring signal;

a branching section for branching the monitoring signal into two signals;

an optical carrier component extracting section for passing therethrough only a signal component of one of the branched monitoring signals that is in a vicinity of the frequency $f_1$;

an optical carrier component level detecting section for detecting a level of the signal outputted by the optical carrier component level extracting section to output an optical carrier component monitoring signal according to the detected level;

a vestigial sideband component extracting section for passing therethrough only a signal component of the other one of the branched monitoring signals that is in a vicinity of a frequency $2 \times f_1$;

a vestigial sideband component level detecting section for detecting a level of the signal outputted by the vestigial sideband component level extracting section to output a vestigial sideband component monitoring signal according to the detected level; and a suppressing section for suppressing an optical carrier component of the optical intensity-modulated signal by controlling bias voltages to be applied to the first and second Mach-Zehnder interferometers and causing a level of the optical carrier component monitoring signal to be less than or equal to a reference value, and for suppressing an unnecessary one sideband component of the optical intensity-modulated signal by controlling a bias voltage to be applied to the third Mach-Zehnder interferometer and causing a level of the vestigial sideband component monitoring signal to be less than or equal to a reference value, wherein the suppressing section comprises:

a first bias voltage supply section for supplying a bias voltage to be applied to the first Mach-Zehnder interferometer;

a second bias voltage supply section for supplying a bias voltage to be applied to the second Mach-Zehnder interferometer;

a third bias voltage supply section for supplying a bias voltage to be applied to the third Mach-Zehnder interferometer;

an optical carrier component reference value storing section for storing the reference value for the level of the inputted optical carrier component monitoring signal;

a vestigial sideband component reference value storage section for storing the reference value for the level of the inputted vestigial sideband component monitoring signal;

a monitoring signal level storing section for storing the level of the optical carrier component monitoring signal and that of the vestigial sideband component monitoring signal;

a bias voltage storing section for storing the bias voltages supplied by the first and second voltage supply sections;

a monitoring signal level comparing section for comparing level of the newly-inputted optical carrier component monitoring signal with the reference value stored in the optical carrier component reference value storing section and the level of the optical carrier component stored in the optical carrier component level storing section, and for storing the level of the newly-inputted vestigial sideband component monitoring signal with the reference value stored in the vestigial sideband component reference value storage section and the level of the optical carrier component monitoring signal stored in the vestigial sideband component level storing section; and a voltage control section for controlling bias voltages to be applied to the first, second and third Mach-Zehnder interferometers based on a result from the monitoring signal level comparing section.

4. The optical transmission device according to claim 1, wherein the bias voltage control section controls bias voltages to be applied to the first and second Mach-Zehnder interferometers so that the level of the optical carrier component monitoring signal is less than or equal to the reference value, and then controls a bias voltage to be applied to the third Mach-Zehnder interferometer so that the level of the vestigial sideband component monitoring signal is less than or equal to the reference value.

5. The optical transmission device according to claim 1, wherein the bias voltage control section controls a bias voltage to be applied to the third Mach-Zehnder interferometer so that the level of the vestigial sideband component monitoring signal is less than or equal to the reference value, and then controls bias voltages to be applied to the first and second Mach-Zehnder interferometers so that the level of the optical carrier component monitoring signal is less than or equal to the reference value.

6. The optical transmission device according to claim 1, wherein:
the light branching section is a directional coupler provided in the third Mach-Zehnder interferometer for making two of the phase-modulated signals, which have been further phase-modulated, interfere with each other and combining the phase-modulated signals together, so as to output two of the optical intensity-modulated signals; and the optical transmission device further comprises a first port for outputting one of the optical intensity-modulated signals outputted by the directional coupler to an optical transmission path, and a second port for outputting the other one of the optical intensity-modulated signals outputted by the directional coupler to the photodetector section.

7. The optical transmission device according to claim 1, wherein the light branching section branches the optical intensity-modulated signal so that an intensity of the optical signal transmitted along an optical transmission path is greater than that of the monitoring optical signal.

8. A method, implemented by an optical transmission device, for suppressing an optical carrier component and an unnecessary one sideband component of a single-sideband optical intensity-modulated signal with suppressed optical carrier component, the optical transmission device comprising first, second and third Mach-Zehnder interferometers, the method comprising the steps of:

receiving one of two optical signals obtained by branching an optical carrier having a frequency $f_0$ outputted from a light source and outputting a phase-modulated signal obtained by modulating a phase of the input optical signal with an inputted electrical signal having a frequency $f_1$, by using each of the first and second Mach-Zehnder interferometers;

further phase-modulating and combining together the two phase-modulated signals outputted from the first and second Mach-Zehnder interferometers, by using the third Mach-Zehnder interferometer;

branching the optical intensity-modulated signal into an optical signal transmitted along an optical transmission path and a monitoring optical signal;

converting the monitoring optical signal to an electric signal and outputting the electric signal as a monitoring signal;

branching the monitoring signal into two signals;

passing only a signal component of one of the branched monitoring signals that is in a vicinity of the frequency $f_1$;

detecting a level of the signal component in a vicinity of the frequency $f_1$ and outputting an optical carrier component monitoring signal according to the detected level;

passing only a signal component of the other one of the branched monitoring signals that is in a vicinity of a frequency $2 \times f_1$;

detecting a level of the signal component in a vicinity of the frequency $2 \times f_1$ and outputting a vestigial sideband component monitoring signal according to the detected level;

suppressing the optical carrier component by controlling bias voltages to be applied to the first and second Mach-Zehnder interferometers and causing a level of the optical carrier component monitoring signal to be less than or equal to a reference value; and suppressing the unnecessary one sideband component by controlling a bias voltage to be applied to the third Mach-Zehnder interferometer and causing a level of the vestigial sideband component monitoring signal to be less than or equal to a reference value.

9. The optical transmission device according to claim 3, wherein the bias voltage control section controls bias voltages to be applied to the first and second Mach-Zehnder interferometers so that the level of the optical carrier component monitoring signal is less than or equal to the reference value, and then controls a bias voltage to be applied to the third Mach-Zehnder interferometer so that the level of the vestigial sideband component monitoring signal is less than or equal to the reference value.

10. The optical transmission device according to claim 3, wherein the bias voltage control section controls a bias voltage to be applied to the third Mach-Zehnder interferometer so that the level of the vestigial sideband component monitoring signal is less than or equal to the reference value, and then controls bias voltages to be applied to the first and second Mach-Zehnder interferometers so that the level of the optical carrier component monitoring signal is less than or equal to the reference value.

11. The optical transmission device according to claim 2, wherein the light branching section branches the optical intensity-modulated signal so that an intensity of the optical signal transmitted along an optical transmission path is greater than that of the monitoring optical signal.

12. The optical transmission device according to claim 3, wherein the light branching section branches the optical intensity-modulated signal so that an intensity of the optical signal transmitted along an optical transmission path is greater than that of the monitoring optical signal.

* * * * *